(12) United States Patent
Gross

(10) Patent No.: US 9,266,023 B2
(45) Date of Patent: Feb. 23, 2016

(54) PICTORIAL GAME SYSTEM AND METHOD

(75) Inventor: John Nicholas Gross, Berkeley, CA (US)

(73) Assignee: John Nicholas and Kristin Gross, Berkeley, CA (US)

( * ) Notice: Subject to any disclaimer, the term of this patent is extended or adjusted under 35 U.S.C. 154(b) by 1320 days.

(21) Appl. No.: 12/494,013

(22) Filed: Jun. 29, 2009

(65) Prior Publication Data

US 2009/0325696 A1 Dec. 31, 2009

Related U.S. Application Data

(60) Provisional application No. 61/076,495, filed on Jun. 27, 2008.

(51) Int. Cl.
*A63F 13/00* (2014.01)
*A63F 9/00* (2006.01)
*A63F 13/30* (2014.01)
*A63F 9/06* (2006.01)
*A63F 3/04* (2006.01)
*G06F 21/31* (2013.01)

(52) U.S. Cl.
CPC ............. *A63F 13/12* (2013.01); *A63F 13/30* (2014.09); *A63F 3/0423* (2013.01); *A63F 2009/0661* (2013.01); *A63F 2300/558* (2013.01); *A63F 2300/572* (2013.01); *A63F 2300/638* (2013.01); *A63F 2300/8094* (2013.01); *G06F 21/31* (2013.01); *G06F 2221/2133* (2013.01)

(58) Field of Classification Search
CPC .............. A63F 13/12; A63F 2300/558; A63F 2300/572; A63F 2300/8094; A63F 2300/638; A63F 3/0423; A63F 2009/0661

USPC .......................................... 463/9, 31; 273/249
See application file for complete search history.

(56) References Cited

U.S. PATENT DOCUMENTS

| | | | |
|---|---|---|---|
| 4,441,201 | A | 4/1984 | Henderson et al. |
| 5,465,982 | A | 11/1995 | Rebane |
| 5,774,837 | A | 6/1998 | Yeldener et al. |
| 5,897,616 | A | 4/1999 | Kanevsky et al. |
| 5,933,803 | A | 8/1999 | Ojala |

(Continued)

FOREIGN PATENT DOCUMENTS

| | | |
|---|---|---|
| EP | 2045754 | 4/2009 |
| WO | 2008025019 | 2/2008 |

OTHER PUBLICATIONS

Gossweiler, Rich et al.; "What's Up CAPTCHA? A CAPTCHA Based on Image Orientation," WWW 2009, Apr. 20-24, 2009, Madrid, Spain, 10 pages.

(Continued)

*Primary Examiner* — William H McCulloch, Jr.
(74) *Attorney, Agent, or Firm* — PatentBest; Andrew McAleavey

(57) ABSTRACT

A pictorial game allows participants to both contribute and decode pictorial content. The participants' performance, as well as that of artists and their artwork, can be tabulated and presented for community entertainment. Different modes can be used for presenting the images in different platforms, including on standalone platforms, gaming sites, social networking profiles, etc. Supplemental features can be added according to a desired rule set. Speech recognition can be used in some applications of the invention as well. Advertising can be integrated into game play as part of the picture decoding process.

4 Claims, 16 Drawing Sheets

(56) References Cited

U.S. PATENT DOCUMENTS

| | | | |
|---|---|---|---|
| 5,940,799 A | 8/1999 | Bruckert et al. | |
| 5,991,617 A | 11/1999 | Powell | |
| 6,014,441 A | 1/2000 | Mark | |
| 6,157,912 A | 12/2000 | Kneser et al. | |
| 6,191,777 B1* | 2/2001 | Yasuhara et al. | 345/173 |
| 6,195,698 B1 | 2/2001 | Lillibridge et al. | |
| 6,208,970 B1 | 3/2001 | Ramanan | |
| 6,397,181 B1 | 5/2002 | Li et al. | |
| 6,546,369 B1 | 4/2003 | Buth et al. | |
| 6,681,205 B1 | 1/2004 | San Martin et al. | |
| 6,697,769 B1 | 2/2004 | Goodman et al. | |
| 6,699,127 B1* | 3/2004 | Lobb et al. | 463/43 |
| 6,763,373 B2* | 7/2004 | Shiigi | 709/206 |
| 6,851,051 B1 | 2/2005 | Bolle et al. | |
| 6,878,062 B2* | 4/2005 | Bjorklund et al. | 463/17 |
| 6,879,956 B1 | 4/2005 | Honda et al. | |
| 7,222,072 B2 | 5/2007 | Chang | |
| 7,505,946 B2 | 3/2009 | Chellapilla et al. | |
| 7,516,220 B1 | 4/2009 | Stiert | |
| 7,603,706 B2 | 10/2009 | Donnelly et al. | |
| 7,679,604 B2 | 3/2010 | Uhlik et al. | |
| 7,707,251 B2* | 4/2010 | Birch | 709/205 |
| 7,725,395 B2 | 5/2010 | Rui et al. | |
| 7,785,180 B1* | 8/2010 | von Ahn et al. | 463/9 |
| 7,797,191 B2 | 9/2010 | Cotten et al. | |
| 7,827,265 B2 | 11/2010 | Cheever et al. | |
| 7,841,940 B2 | 11/2010 | Bronstein | |
| 7,887,058 B2* | 2/2011 | Ritter et al. | 273/249 |
| 7,909,695 B2* | 3/2011 | Phelps et al. | 463/31 |
| 7,917,508 B1 | 3/2011 | Baluja et al. | |
| 7,929,805 B2 | 4/2011 | Wang et al. | |
| 7,945,952 B1 | 5/2011 | Behforooz | |
| 8,005,197 B2 | 8/2011 | Baird et al. | |
| 8,019,127 B2 | 9/2011 | Misra | |
| 8,032,481 B2 | 10/2011 | Pinckney et al. | |
| 8,032,483 B1 | 10/2011 | Haveliwala et al. | |
| 8,036,902 B1 | 10/2011 | Strom et al. | |
| 8,166,388 B2* | 4/2012 | Gounares et al. | 715/230 |
| 8,380,503 B2* | 2/2013 | Gross | 704/246 |
| 8,403,761 B2* | 3/2013 | Kira et al. | 463/43 |
| 8,601,538 B2* | 12/2013 | Qvarfordt et al. | 726/2 |
| 8,752,141 B2* | 6/2014 | Gross | 726/5 |
| 2002/0013708 A1 | 1/2002 | Walker et al. | |
| 2002/0016196 A1* | 2/2002 | Orak | 463/9 |
| 2002/0090993 A1* | 7/2002 | Koshiro et al. | 463/30 |
| 2003/0004719 A1 | 1/2003 | Yuschik | |
| 2003/0022717 A1* | 1/2003 | Bjorklund et al. | 463/37 |
| 2003/0033145 A1 | 2/2003 | Petrushin | |
| 2003/0093280 A1 | 5/2003 | Oudeyer | |
| 2003/0125944 A1 | 7/2003 | Wohlsen et al. | |
| 2003/0163316 A1 | 8/2003 | Addison et al. | |
| 2003/0182119 A1 | 9/2003 | Junqua et al. | |
| 2003/0194211 A1* | 10/2003 | Abecassis | 386/69 |
| 2003/0214553 A1* | 11/2003 | Dodge | 347/41 |
| 2003/0217336 A1* | 11/2003 | Gounares et al. | 715/541 |
| 2004/0019485 A1 | 1/2004 | Kobayashi et al. | |
| 2004/0102975 A1 | 5/2004 | Eide | |
| 2004/0125877 A1* | 7/2004 | Chang et al. | 375/240.28 |
| 2004/0158495 A1* | 8/2004 | Gennaro et al. | 705/23 |
| 2004/0249628 A1 | 12/2004 | Chelba et al. | |
| 2004/0254793 A1 | 12/2004 | Herley et al. | |
| 2005/0071163 A1 | 3/2005 | Aaron et al. | |
| 2005/0105712 A1 | 5/2005 | Williams et al. | |
| 2005/0114137 A1 | 5/2005 | Saito et al. | |
| 2005/0114705 A1 | 5/2005 | Reshef et al. | |
| 2005/0125226 A1 | 6/2005 | Magee | |
| 2005/0159206 A1* | 7/2005 | Bjorklund et al. | 463/17 |
| 2005/0159950 A1 | 7/2005 | Roth et al. | |
| 2005/0171851 A1 | 8/2005 | Applebaum et al. | |
| 2005/0184461 A1* | 8/2005 | Cogliano et al. | 273/272 |
| 2005/0185847 A1 | 8/2005 | Rowe | |
| 2005/0228641 A1 | 10/2005 | Chelba et al. | |
| 2005/0267752 A1 | 12/2005 | Navratil et al. | |
| 2006/0074677 A1 | 4/2006 | DeSimone | |
| 2006/0248019 A1 | 11/2006 | Rajakumar | |
| 2006/0277045 A1 | 12/2006 | Gleason | |
| 2007/0016689 A1* | 1/2007 | Birch | 709/241 |
| 2007/0018393 A1 | 1/2007 | Ritter et al. | |
| 2007/0043681 A1 | 2/2007 | Morgan et al. | |
| 2007/0071206 A1 | 3/2007 | Gainsboro et al. | |
| 2007/0073630 A1 | 3/2007 | Greene et al. | |
| 2007/0112570 A1 | 5/2007 | Kaneyasu | |
| 2007/0113294 A1 | 5/2007 | Field et al. | |
| 2007/0162761 A1 | 7/2007 | Davis et al. | |
| 2007/0165821 A1 | 7/2007 | Altberg et al. | |
| 2007/0213111 A1* | 9/2007 | MacIver et al. | 463/9 |
| 2007/0271830 A1 | 11/2007 | Holt et al. | |
| 2007/0280436 A1 | 12/2007 | Rajakumar | |
| 2007/0282605 A1 | 12/2007 | Rajakumar | |
| 2008/0072293 A1 | 3/2008 | D'Urso | |
| 2008/0127302 A1 | 5/2008 | Qvarfordt et al. | |
| 2008/0140420 A1 | 6/2008 | Lee | |
| 2008/0175174 A1 | 7/2008 | Altberg et al. | |
| 2008/0216163 A1 | 9/2008 | Pratte et al. | |
| 2009/0012855 A1 | 1/2009 | Jamal et al. | |
| 2009/0013391 A1 | 1/2009 | Ernst | |
| 2009/0042648 A1* | 2/2009 | Phelps et al. | 463/31 |
| 2009/0055193 A1 | 2/2009 | Maislos et al. | |
| 2009/0077629 A1 | 3/2009 | Douceur | |
| 2009/0113294 A1 | 4/2009 | Sanghavi et al. | |
| 2009/0150983 A1 | 6/2009 | Saxena et al. | |
| 2009/0204819 A1 | 8/2009 | Parker | |
| 2009/0241174 A1 | 9/2009 | Rajan et al. | |
| 2009/0249476 A1 | 10/2009 | Seacat | |
| 2009/0259468 A1 | 10/2009 | Schroeter | |
| 2009/0280895 A1* | 11/2009 | Yamaoka et al. | 463/30 |
| 2009/0297064 A1 | 12/2009 | Koziol et al. | |
| 2009/0309698 A1 | 12/2009 | Headley et al. | |
| 2009/0313694 A1 | 12/2009 | Mates | |
| 2009/0319270 A1* | 12/2009 | Gross | 704/246 |
| 2009/0319271 A1* | 12/2009 | Gross | 704/246 |
| 2009/0319274 A1* | 12/2009 | Gross | 704/260 |
| 2009/0325661 A1* | 12/2009 | Gross | 463/9 |
| 2009/0325696 A1* | 12/2009 | Gross | 463/31 |
| 2009/0328150 A1* | 12/2009 | Gross | 726/3 |
| 2010/0049526 A1 | 2/2010 | Lewis et al. | |
| 2010/0077210 A1 | 3/2010 | Broder et al. | |
| 2011/0085700 A1 | 4/2011 | Lee | |
| 2011/0098117 A1* | 4/2011 | Tanaka | 463/42 |
| 2011/0201396 A1* | 8/2011 | Ritter et al. | 463/7 |
| 2012/0100910 A1* | 4/2012 | Eichorn et al. | 463/31 |
| 2012/0179742 A1 | 7/2012 | Acharya et al. | |
| 2013/0166726 A1 | 6/2013 | Boldyrev et al. | |
| 2014/0020084 A1* | 1/2014 | Gross | 726/16 |
| 2014/0289828 A1* | 9/2014 | Gross | 726/6 |
| 2014/0295927 A1* | 10/2014 | Gross | 463/9 |

OTHER PUBLICATIONS

Von Ahn, Luis et al.; "Labeling Images with a Computer Game," CHI 2004, Apr. 24-29, 2004, Vienna, Austria, 8 pages.

Von Ahn, Luis et al. "Peekaboom: a game for locating objects in images," Proceedings of the SIGCHI conference on Human Factors in computing systems, Apr. 22-27, 2006, Montréal, Québec, Canada, 23 pages.

"Guess-a-Sketch," web.archive.org/web/.../GAS.html, Nov 24, 2002, 5 pages.

"GWAP," http://blog.gwap.com/2008/05/hellow-world.html, May 13, 2008, 3 pages.

Arbel, Eran et al; "An automated method for distinguishing between humans and computers using voice," U.S. Appl. No. 60/891,042, filed Feb. 22, 2007, 4 pages.

Stone, Jonathon; "A Guide to Speaker Verification," Produced by ICR Speech Solutions & Services, Oct. 28, 2003, 11 pages.

Reynolds, Douglas et al.; "Automatic Speaker Recognition Recent Progress, Current Applications, and Future Trends," Presented at the AAAS 2000 Meeting Humans, Computers and Speech Symposium, Feb. 19, 2000, 36 pages.

Anonymous; "Speaker Verification Testing Final Report Draft 1.0," International Biometric Group, 2004, 31 pages.

Nass, Clifford et al.; "Does Computer-Synthesized Speech Manifest Personality? Experimental Tests of Recognition, Similarity-Attrac-

(56) References Cited

OTHER PUBLICATIONS tion, and Consistency-Attraction," Journal of Experimental Psychology: Accepted Apr. 3, 2001, vol. 7, No. 3, 171-181.

Arrenius, Lisa; "Speech Synthesis on the World Wide Web: Evaluation of the Uppsala University Internet Portal," Master's thesis in Computational Linguistics, Jun. 4, 2004, 61 pages.

Beutnagel, M. et al.; "The AT&T Next-Gen TTS System," http://www.research.att.com/projects/tts, 1999, 4 pages.

Markkola, Anu et al.; "Accessible Voice CAPTCHAs for Internet Telephony," Symposium on Accessible Privacy and Security (SOAPS) 2008, Jul. 23, 2008, Pittsburgh, PA USA, 2 pages.

Thuras, Dylan; "The Turing Test and Machine Intelligence," http://htmltimes.com/turing-test-machine-intelligence.php, Nov. 4, 2008, 3 pages.

Reynolds, Douglas; "Automatic Speaker Recognition: Current Approaches and Future Trends," This paper is based in part on the tutorial "Speaker Verification: From Research to Reality" by D.A. Reynolds and L.P. Heck, ICASSP 2001, 6 pages.

Mori, Greg et al.; "Recognizing Objects in Adversarial Clutter: Breaking a Visual CAPTCHA," University of California Berkeley Computer Science Department, 2003, 8 pages.

Lopresti, Daniel; "Leveraging the CAPTCHA Problem," Presented at the Second International Workshop on Human Interactive Proofs, Bethlehem, PA, May 2005, 15 pages.

Baird, Henry et al.; "Human interactive proofs and document image analysis," in Proc., IAPR 2002 Workshop on Document Analysis Systems, (Princeton, NJ), Aug. 2002, 12 pages.

Pope, Clark et al.; Abstract of "Is It Human or Computer? Defending E-Commerce with Captchas," IT Professional, vol. 7, No. 2, Mar./Apr. 2005, 1 page.

Schuckers, Stephanie; "Spoofing and Anti-Spoofing Measures," Information Security Technical Report, vol. 7, No. 4, Dec. 10, 2002, pp. 56-62.

International Search Report and Written Opinion for PCTIUS2009/047413, mailed Oct. 15, 2009, 18 pages.

Aaron, Andy et al. "Conversational Computers." Scientific American, Jun. 2005, 6 pages.

Bigham, J.P. et al., "Evaluating existing audio CAPTCHAs and an interface optimized for non-visual use," in proceedings of ACM CHI 2009 Conference on Human Factors in Computing Systems, Apr. 2009, pp. 1829-1838.

Golle, P.; "Machine learning attacks against the Asirra CAPTCHA," in proceedings of the 15th ACM Conference on Computer and Communications Security, Alexandria, Virginia, USA, Feb. 28, 2008, 535-542.

Tsz-Yan Chan; "Using a test-to-speech synthesizer to generate a reverse Turing test," Tools with Artificial Intelligence, 2003. Proceedings. 15th IEEE International Conference on, vol., No., pp. 226-232, Nov. 3-5, 2003.

Kochanski, G., Lopresti, D., and Shih, C.; "A Reverse Turing Test Using Speech," Seventh International Conference on Spoken Language Processing, Sep. 2002.

Schlaikjer. "A Dual-Use Speech CAPTCHA: Aiding Visually Impaired Web Users while Providing Transcriptions of Audio Streams," Technical Report CMU-LTI-07-014, Carnegie Mellon University. Nov. 2007.

Bohr et al.; "Improving auditory CAPTCHA security." ISR Tech. rep., University of Maryland, College Park, MD, 2008.

International Search Report and Written Opinion for PCT/US2009/047413, mailed Oct. 15, 2009, 18 pages.

Russ, John C. "The Image Processing and Analysis Cookbook." Copyright 1996-2001. p. 1,37,38,53,54,241,242.

* cited by examiner

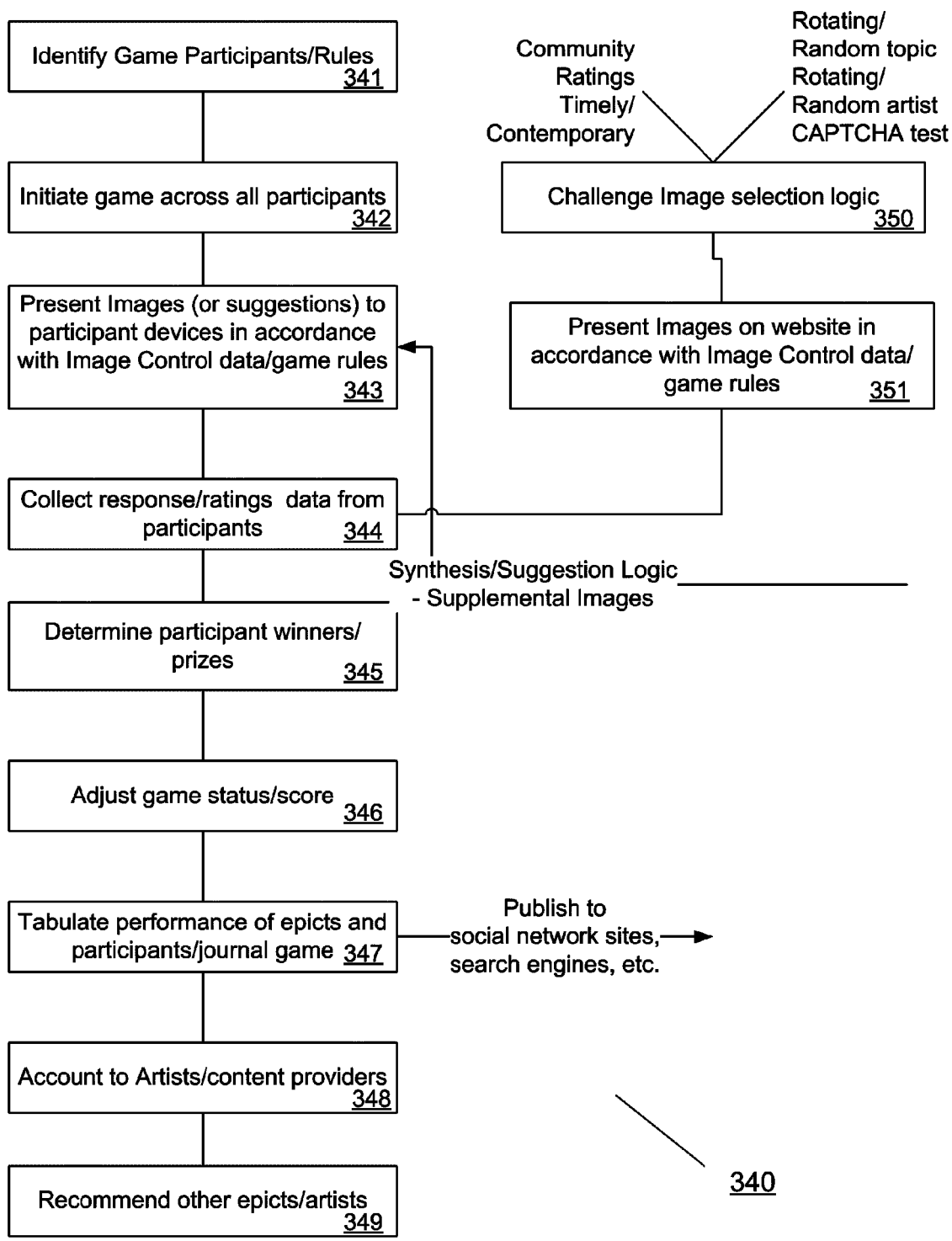

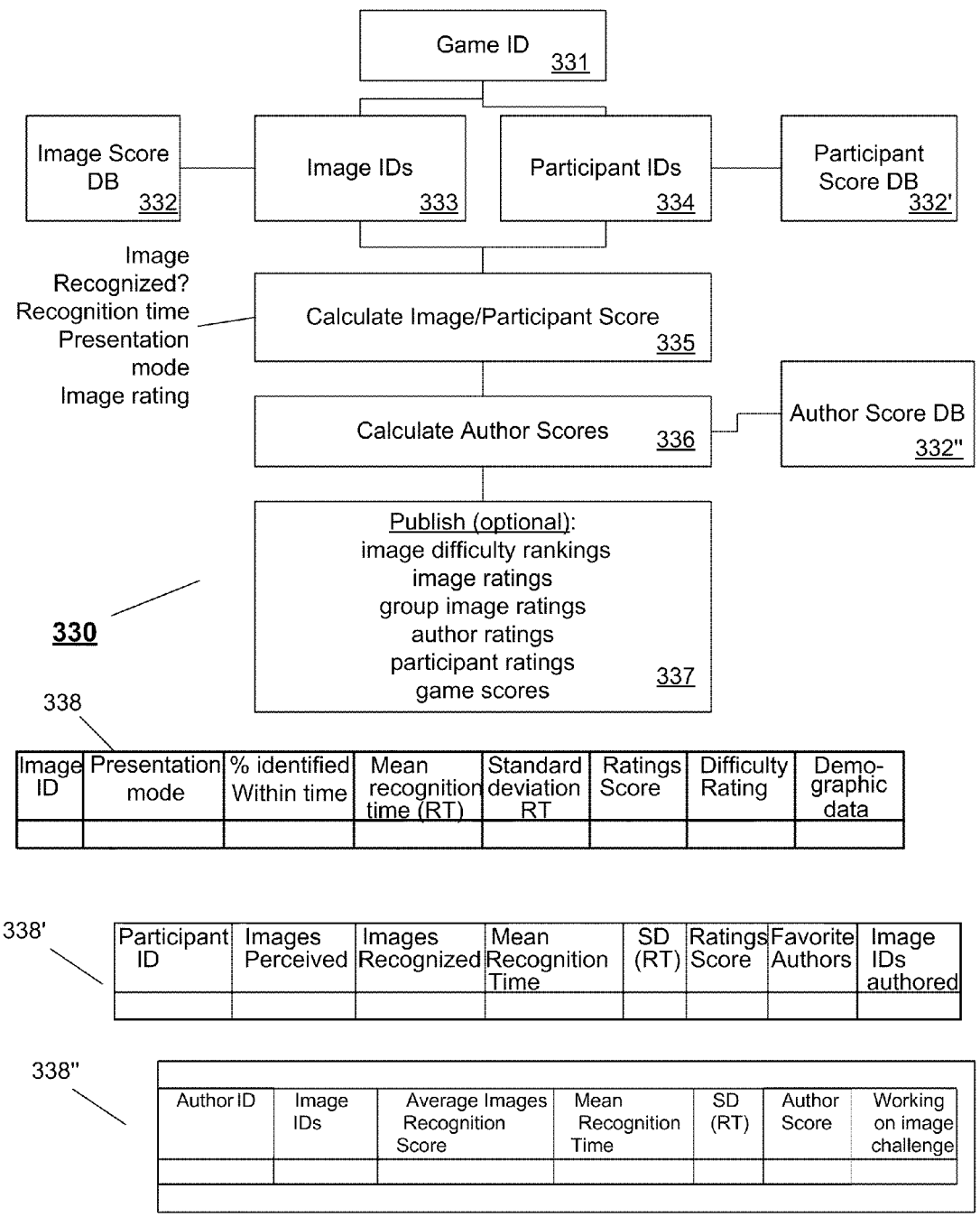

SYNTHESIS - SUGGESTION MODULE

ADVERTISING MODULE

Fig. 3G
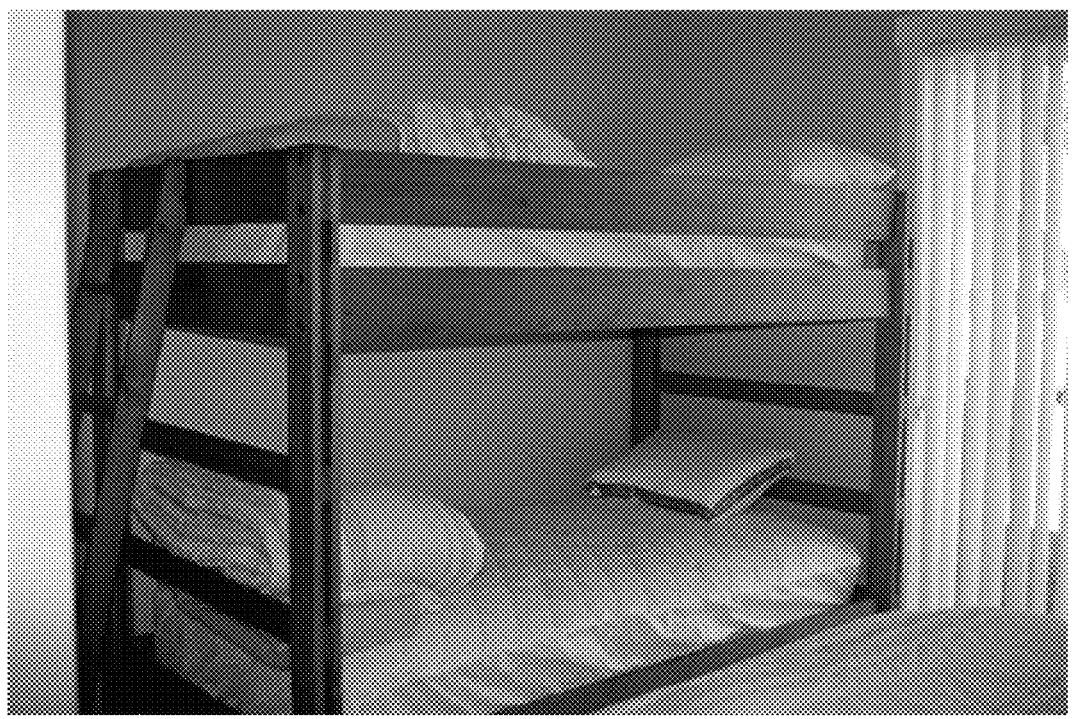
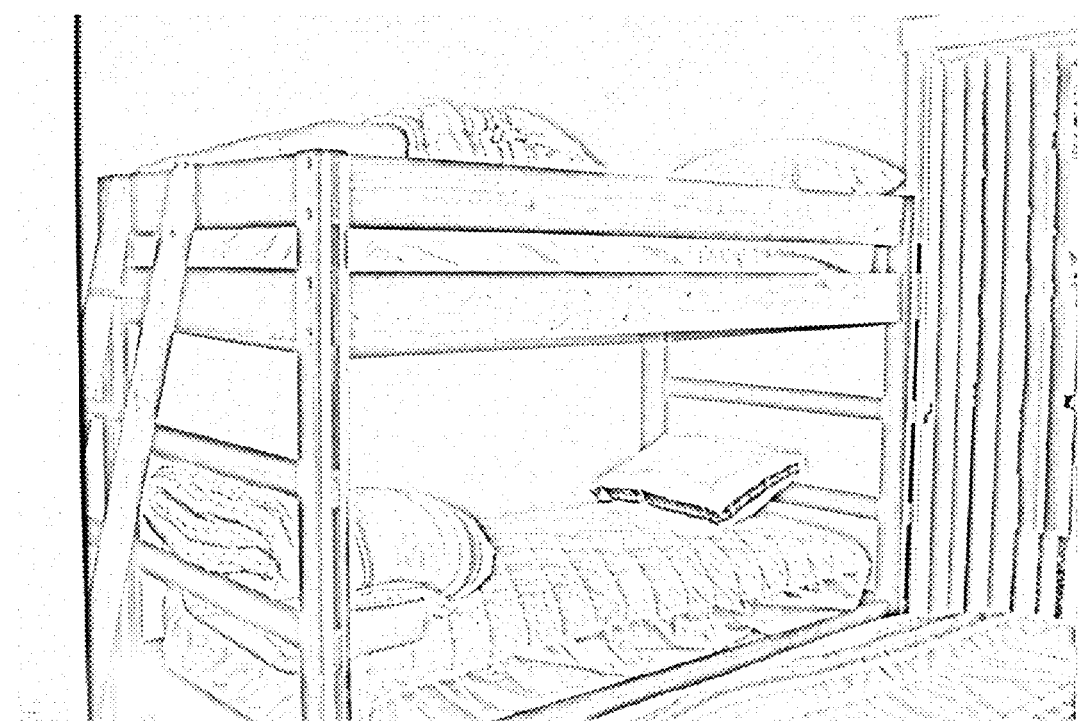

Fig. 3H
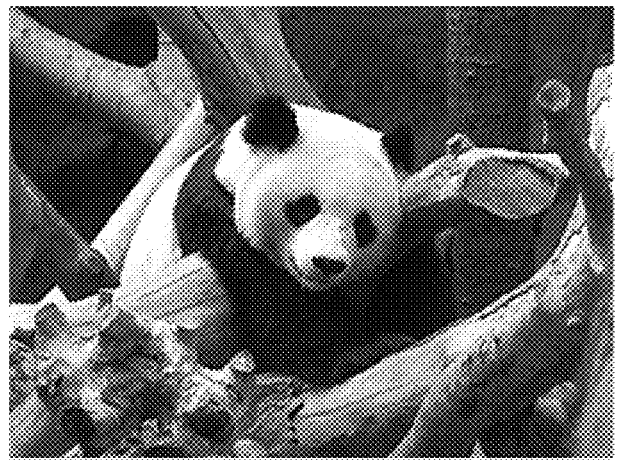
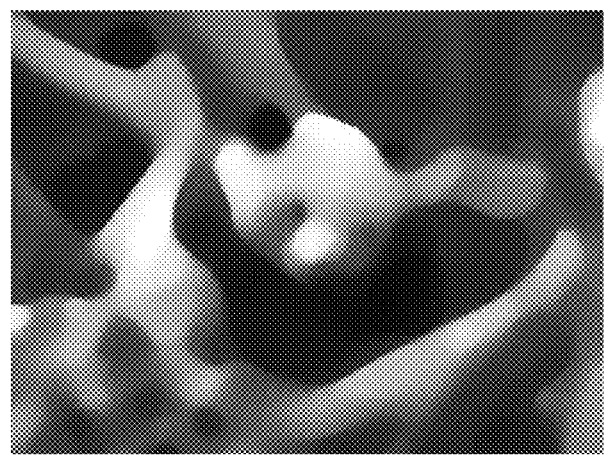

*Fig. 3J*
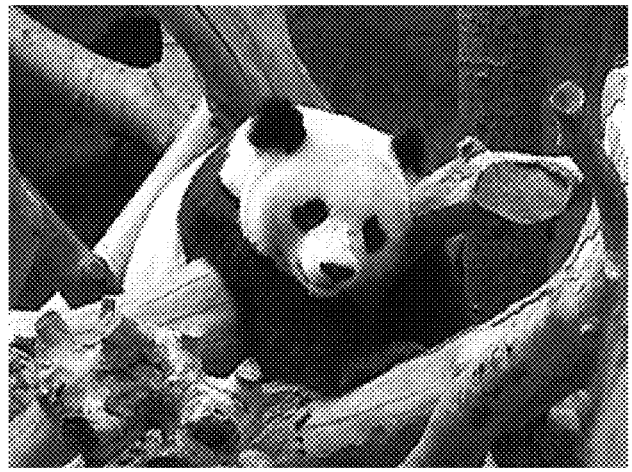

PICTORIAL GAME SYSTEM AND METHOD

RELATED APPLICATION DATA

The present application claims the benefit under 35 U.S.C. 119(e) of the priority date of Provisional Application Ser. No. 61/076,495 filed Jun. 27, 2008 which is hereby incorporated by reference. The application is further related to the following applications, all of which are filed on this same date and incorporated by reference herein:
  Internet Based Pictorial Game System & Method; Ser. No. 12/494,065
  Progressive Pictorial & Motion Based CAPTCHAs; Ser. No. 12/494,083

FIELD OF THE INVENTION

The present invention relates to electronic games which include pictorial features, and more particularly for applications which rely on user contributed content and participation in creating game components.

BACKGROUND

A popular board game introduced many years ago goes by the name of PICTIONARY™. In this game teams of players compete against each other by having one member of the team manually draw an object (which could be a person, place, thing, action, etc.) while the other members of the team attempt to guess the identity of the object. A time factor is also accounted for in that the team must determine the object within a certain time period.

PICTIONARY™ is one form of pictorial game that has enjoyed great success in the market, but it has not been rendered into a form suitable for Internet accessibility. One example of a drawing game that has been implemented in electronic form is depicted in US Publication No. 2007/0018393, incorporated by reference herein. It is apparent that there is a need for other similar types of games with different rules, objectives that can be enjoyed in electronic form, and particularly on sites available on the Internet (including social network sites) and other hand held devices (including advanced phones).

CAPTCHAs (Completely Automatic Public Turing Tests To Tell Humans And Computers Apart) are well-known for controlling access to computers and resources on the Internet. A recent example by Sanghavi et al. (US Publication No. 2009/0113294) incorporated by reference herein demonstrates the use of a progressive CAPTCHA. The use of a progressive technique increases the cost to spammers seeking to use human capital to circumvent text based CAPTCHAs. While Sanghavi et al propose their approach for conventional (distorted) text type challenges, they fail to appreciate the potential for image based challenges. In particular, recognition of images can be incorporated as part of a picture based game to develop appropriate challenges, unlike text approaches.

SUMMARY OF THE INVENTION

An object of the present invention, therefore, is to reduce and/or overcome the aforementioned limitations of the prior art.

A first aspect of the invention concerns a method of conducting a pictorial based electronic game comprising the steps: presenting an electronic image authored by a human composer within a graphical interface; wherein the electronic image is presented in a visual sequence that substantially tracks a rendering of such image as performed by such human composer; associating the electronic image with one or more concepts; providing a rule set for a user to use to predict an identity of the one or more concepts; processing responses from the user in compliance with the rule set to determine if the user has accurately determined an identity of the one or more concepts associated with the image; wherein the electronic image is presented to the user during at least a portion of the visual sequence substantially without explicit textual information describing is the one or more respective concepts.

The electronic image can be presented on a user's television system, a browser, a portable computing device such as a PDA, cell phone, etc. The images can be created automatically or by human composers with an online graphical composition tool. In some embodiments the responses from the user are tabulated to compute a performance of the user, the electronic image, and an artist associated with the electronic image.

Some embodiments may also provide one or more audiovisual cues and/or clues to the user to assist in decoding the electronic image. An electronic advertisement can be provided as part of the one more audiovisual cues and/or clues. The audiovisual cues and/or clues can be derived from images associated with a second set of concepts semantically related to the one or more concepts.

For some applications the electronic image is presented at different time intervals with differing levels of resolution, noise and/or pixelation.

In other applications the responses are provided as speech utterances and recognized by a speech recognition engine. The speech recognition engine can be configured to listen to multiple users simultaneously to determine a winner.

A graphical tool can be provided to permit the user to create a second electronic image to be decoded by a second user. Users can also avail themselves of a file uploading tool in some cases for permitting the user to upload a photographic file image to be decoded by a second user.

The invention also supports team play for some embodiments. Different teams can compete against each other, even from at different physical locations. In team play the teams can influence an identity and/or a composition of the electronic image during a competition.

In some embodiments the ability to repeat the game for a plurality of second electronic images constituting a benchmark set is allowed, so that the user's responses are measured against other users to determine a performance rating relative to the benchmark set. A recommendation engine can be used to is recommend at least one of an artist or a second electronic image to the user based on the responses.

Still further embodiments derive the electronic image automatically based on a content of an Internet page. In some portable applications a series of different electronic images are presented in response to a change in orientation of a portable device which is presenting the images.

Another aspect of the invention concerns conducting a pictorial based electronic game comprising the steps: presenting an electronic image within a graphical interface, the electronic image being derived from a scene captured by a machine and embodied in a digital and/or photographic form; wherein the electronic image is presented in a visual sequence that varies so that content is gradually revealed for the image over a first time period; associating the electronic image with one or more concepts; providing a rule set for a user to use to predict an identity of the one or more concepts; processing responses from the user in compliance with the rule set to determine if the user has accurately determined an identity of the one or more concepts associated with the image; wherein the electronic image is presented to the user during at least a portion of the first time period substantially without textual information describing the one or more respective concepts.

An additional step can be performed to combine the digital and/or photographic form with other metadata for the scene in to the electronic image. A computing system can be trained and employed to automatically find digital and/or photographic form images in one or more Internet accessible image repositories. The electronic images can include scene component, scene timing information and device orientation for the scene as part of the electronic image. Advertising information for the scene can also be incorporated as part of the electronic image.

Still another aspect concerns conducting a pictorial based electronic game comprising the steps: presenting an electronic image within a graphical interface, the electronic image being derived from a scene captured by a machine and embodied in a digital and/or photographic form; wherein the electronic image is is presented in a visual sequence that varies so that content is gradually revealed for the image over a first time period; associating the electronic image with one or more concepts; providing a rule set for a user to use to predict an identity of the one or more concepts; processing responses from the user in compliance with the rule set to determine if the user has accurately determined an identity of the one or more concepts associated with the image; wherein the electronic image is presented to the user during at least a portion of the first time period substantially without textual information describing the one or more respective concepts. Another aspect of the invention concerns operating an Internet based pictorial game with a computing system comprising: providing a database of game images related to associated topics, the game images being generated by human composers; associating the electronic image with one or more concepts; providing a rule set for a user to use to give a prediction of an identity of the one or more concepts; presenting the game image with the computing system in a visual sequence that substantially tracks a rendering of such image as performed by such human composer; automatically processing responses from the user in compliance with the rule set with the computing system to determine if the user has accurately determined an identity of the one or more concepts associated with the image; wherein the electronic image is presented to the user substantially without explicit textual information describing the one or more respective concepts. The game image is preferably presented within a web page loaded in an Internet browser, and can be part of a game website, and/or integrated as part of a personal profile page on a social networking site.

As with the other approaches users can participate as a team or in competition against each other in providing the predictions. Their scores can be based on a time required to give an accurate prediction for the image. Additional visual clues semantically related to the respective concepts can be presented simultaneously to the user with the game images.

Advertisements can be matched to the game images based on a plurality is of bids provided in an auction by multiple advertisers. The ads can be matched to artists based on a plurality of bids provided in an auction by multiple advertisers for artists composing the game images.

Still another aspect concerns operating an Internet based pictorial game with a computing system comprising: providing a database of game images related to associated topics; associating the game image with one or more concepts; providing a rule set for a user to use to give a prediction of an identity of the one or more concepts; presenting the game image with the computing system in a visual sequence that varies so that content is gradually revealed for the image over a first time period; automatically processing responses from the user in compliance with the rule set with the computing system to determine if the user has accurately determined an identity of the one or more concepts associated with the image; wherein the electronic image is presented to the user during at least a portion of the first time period substantially without explicit textual information describing the one or more respective concepts. The game image is preferably revealed in a spatially random sequence.

A further aspect concerns operating an Internet based pictorial game on a social networking site with a computing system comprising: providing a database of game images related to associated topics; associating the electronic image with one or more concepts; wherein the game images are contributed by members of the social networking site; presenting the game image with the computing system within a social networking site page in a visual sequence that varies so that content is gradually revealed for the image over a first time period; wherein the electronic image is presented to the user during at least a portion of the first time period substantially without explicit textual information describing the one or more respective concepts; automatically processing responses from the user with the computing system to determine if the user has accurately determined an identity of the one or more concepts associated with the image; selectively publishing results of the user's performance on the social networking site. In some embodiments multiple members of the social networking site can play the game in a collaborative mode.

Yet another aspect is directed to a pictorial based electronic game that includes one or more software modules implemented in a computer readable medium to effectuate the above aspects.

Another aspect concerns a method of testing recognition of images for a CAPTCHA (Completely Automatic Public Turing Tests To Tell Humans And Computers Apart) system comprising: automatically electing an electronic image for a participant with a computing system, wherein the electronic image comprises imagery other than words; associating the electronic image with one or more concepts; progressively revealing information over a first time period for the electronic image within an interface for the participant using the computing system; automatically processing responses from the participant with the computing system to correlate an accuracy of guesses from the participant for the one or more concepts associated with the electronic image.

Preferred embodiments use a step of calculating a percentage of participants able to decode and accurately guess the one or more concepts within a predetermined time. The electronic image can be presented at different time intervals with differing levels of resolution, noise and/or pixelation. The electronic images can then be randomly selected as needed within a CAPTCHA system for granting access to resources of a second computing system, including a portable electronics device.

A further aspect concerns providing a visual CAPTCHA (Completely Automatic Public Turing Tests To Tell Humans And Computers Apart) challenge comprising: automatically electing an electronic image for a participant with a computing system, wherein the electronic image comprises imagery other than words; associating the electronic image with one or more concepts; progressively revealing information over a first time period for the electronic image within an interface for the participant using the computing system; automatically processing responses from the participant with the computing system to detect if a guess from the participant for the one or more concepts associated with the electronic image meets a required threshold.

In some embodiments the responses are received in audible form and processed by a speech recognition device adapted to recognize human voices. The visual CAPTCHA challenge can be combined with a physical CAPTCHA challenge requiring the user to manipulate the portable computing device in a prescribed manner. The physical CAPTCHA challenge can also interact with elements of the electronic image and/or other objects presented in the interface.

Another aspect is directed to providing a motion and/or orientation based CAPTCHA (Completely Automatic Public Turing Tests To Tell Humans And Computers Apart) challenge on a portable computing device comprising: automatically electing a manipulation challenge for a user with the portable computing device, wherein the manipulation challenge includes a set of physical manipulation instructions for the portable computing device for the user; automatically processing sensory data associated with user movements and/or manipulations of the portable computing device; automatically determining if the user movements and/or manipulations from the user meet a required threshold for satisfying the set of manipulation instructions.

The set of physical manipulation instructions for the motion and/or orientation based CAPTCHA challenge can be presented in an electronic image, and/or in audible form by a text to speech engine operating on the portable computing device. The set of physical manipulation instructions typically require the user to move the portable computing device so as to manipulate objects presented in an interface. For example, the set of physical manipulation instructions may require the user to orient a needle of a virtual compass in a specified direction, or explain (in spoken form) what direction the needle is pointing to at any moment in time. Alternatively the physical manipulation instructions can require the user to speak or blow into a microphone.

Still another aspect concerns providing a touch based CAPTCHA (Completely Automatic Public Turing Tests To Tell Humans And Computers Apart) challenge on a portable computing device comprising: automatically electing a manipulation challenge for a user with the portable computing device, wherein the manipulation challenge includes a set of physical touch instructions for the portable computing device for the user; automatically processing touch is sensory data associated with user movements and/or manipulations of objects within a graphical interface of the portable computing device; automatically determining if the user touch sensory data meets a required threshold for satisfying the set of physical touch instructions.

In some embodiments the set of physical touch instructions for the motion and/or orientation based CAPTCHA challenge are presented in an electronic image, and/or in audible form by a text to speech engine operating on the portable computing device. The instructions may require the user to arrange a set of letters on the graphical interface, or orient an object in a proper direction.

A further aspect concerns the fact that the various CAPTCHA challenges are embodied in a computer readable form and implemented as one or more routines executing on a portable computing device which also has motion, orientation, touch and/or microphone sensors.

DESCRIPTION OF THE DRAWINGS

FIG. 3B illustrates a preferred embodiment of a pictorial game image presentation engine;

FIG. 3C illustrates a preferred embodiment of a pictorial game tabulating module;

FIGS. 3G, 3H and 3J show examples of user contributed content that can be artistically styled and formatted for embodiments of the present invention;

DETAILED DESCRIPTION

Figure 1:
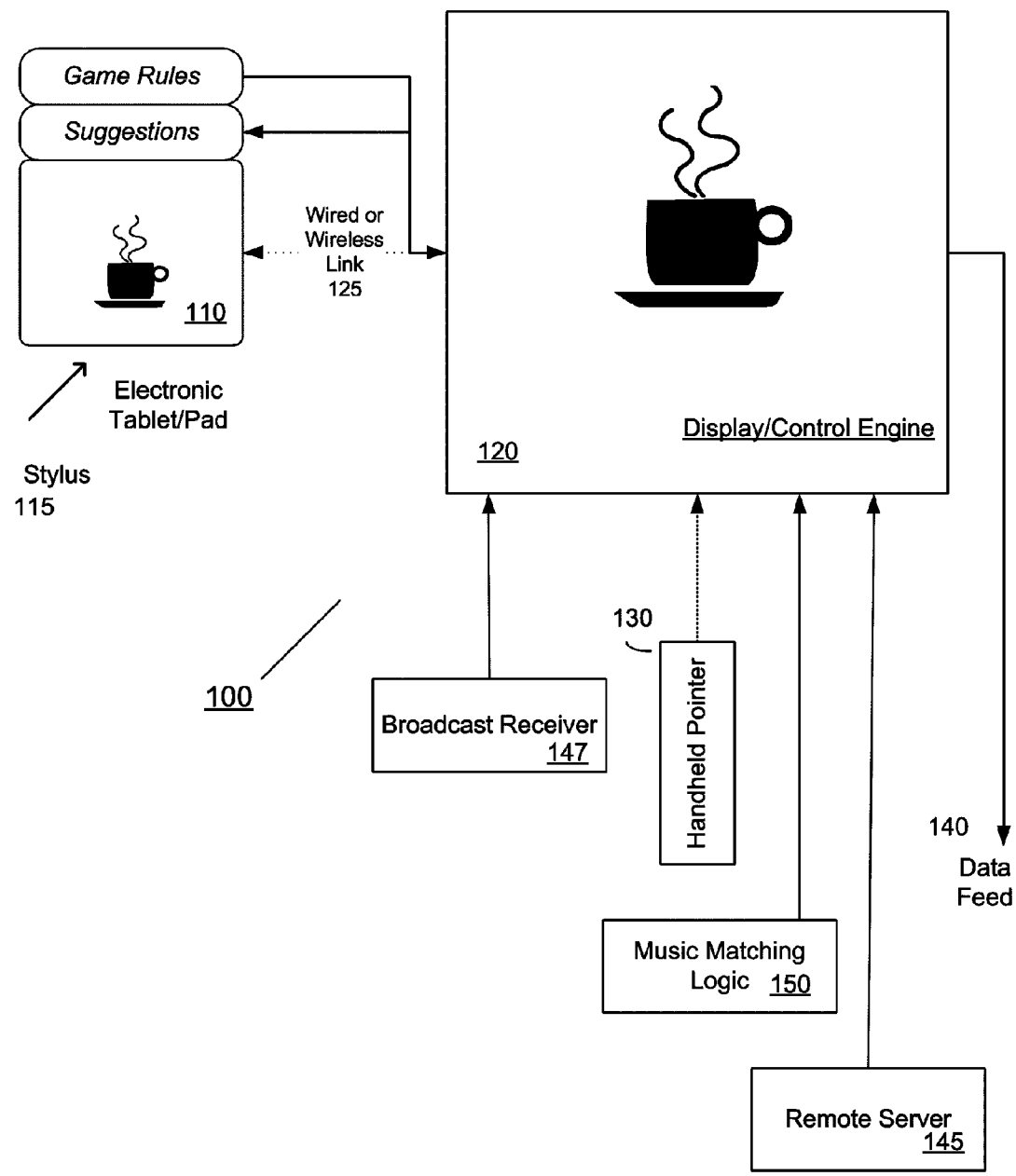
FIG. 1 is an illustration of a first embodiment of a pictorial game implemented on a stand alone computer or console.

FIG. 1 is an illustration of a first embodiment of an electronic pictorial game 100 implemented on a stand alone computer or console. In this embodiment an input device 110, which may be an electronic tablet, pad, or equivalent canvass is used by a human artist to create electronic pictures, generally referenced herein as "epicts." Again, as noted above, the epicts may represent human authored viewable renditions of human perceivable concepts, which, in the broadest sense may be in the form of ideas, people, places, things, actions, emotions, etc. In other cases the epicts may be conventional electronic photographic images which have been formatted to be compatible with an accompanying presentation system.

A stylus 115 is preferably used to aid with such process, and is adapted for human manipulation such as in the form of a hand held pen. Other types of manipulable tools can also be used of course depending on the particular game and desired manipulation (eye, head, foot, etc.) required to provide input.

The epict is displayed for viewing by the artist and other game participants on a display 120 which may be coupled to or part of a computing device with a software/hardware engine adapted for rendering the image in appropriate form. Thus the display may be part of a television, a computer monitor, etc., and the accompanying computing device may be a personal computer, a game console or other similar device.

Data is communicated to and from the input device 110 through a communications channel 125 which is preferably a wireless link. In some embodiment it may be desirable to provide feedback to the artist in the form of game rules, suggestions, etc. to the tablet for consideration. The image data can be transferred over the channel in any desired form.

Other variations of such architecture are of course possible, such as the use of multiple tablets/pads 110 (and accompanying stylus devices 115) to allow for multi-player simultaneous play. In such instances it may be useful to divide display 120 into distinct regions and partitions for displaying the various artistic renditions. For example, with 4 artists the display could be divided into 4 quadrants, which would allow participants to view 4 simultaneous renditions of an object.

In other embodiments a handheld pointer 130 may be used to draw directly on the screen display 120. The pointer may be of the type used in the Wii gaming platform which is a well-known system for this type of interactivity. For some embodiments it may be possible to use an electronic PDA or cellphone that is synced to the gaming console 120 to provide the epicts.

In its most basic form the pictorial game 100 can be configured to use a set of rules and scoring options that imitates the functionality of the Pictionary game noted earlier. For example the participants could be required to rotate the artist function, the participants could be required to move a visible token across a virtual playboard projected on display 120, the participants required to guess the concept in a particular time period, etc. In this version of the game, the participants play on teams which compete against each other to guess what is concept is being drawn by a co-team member. The concepts may be supplied by the game engine 120, or may be supplied by a remote server 145. It would be relative easy for these functions to be implemented electronically and this option may be attractive to persons who like such game and want to duplicate the experience in enhanced form with an electronic platform. Nonetheless a variety of additional or modified rules and options for drawing, scoring, guessing, etc., could be elected depending on the desired game format, and such features could be adopted on a game by game basis by the game host and participants.

As an example of such modified rules, the game could be run without requiring players/participants to provide responses or guesses. In one such case artists could contribute their epicts in connection with an ongoing event that they are attending (e.g., a concert, sporting event, trade show and the like), viewing (as in a television broadcast or gaming experience seen on receiver 147) or hearing. The epicts could be directed to different topics and aspects of the vent, and could form part of a collective artistic gallery that is presented to a larger audience of the event simply for viewing and entertainment. Again, the organizers of such event could use human or machine editors to solicit and select particular ones of the epicts that appear superior to others. For example at a sports stadium/arena a fan's live artistic contribution could be displayed on the scoreboard and the like.

In other embodiments the invention could be used at various events to solicit and encourage crowd and audience participation. For example, at a music concert, attendees could be given a chance to enter their sketches of the events occurring at the concert, such as the make up of the band, caricatures of the band members, etc. These sketch submissions could be uploaded and viewed by event managers to identify and select particular sketches for recognition. The recognition in turn could consist of financial or non-monetary incentives for the contributor. In other instances fan contributions could be displayed and viewed dynamically (along with attribution to the fan by name, seat number, etc.) as they are created for further enjoyment. This same format could be used at sporting events and other large public gatherings where it would be desirable to report is graphical data in real-time for public consumption.

For some games it may be desirable for the participants to upload the game data to an offsite location for storage, review, etc., using a data feed 140. The epicts, concepts and participant information could thus be integrated into the feed 140 which can be incorporated within a social network site page or broadcast to other authorized friends and third parties. For example many social networking sites now include specific areas for allowing user contributions to be added dynamically to a personalized page.

Similarly the epicts may be compiled by concept, topic, etc. by a remote server 145 for presentation to other network users. The remote server may be programmed with additional game reward logic to give prizes, recognition, etc. to participants and teams in real-time to facilitate and increase game interest. If desired, the entire game could be journalled and replayed (at higher speeds as well) at a later time for viewing.

It will be understood by those skilled in the art that other features could be implemented into the present embodiment to add to the interest/excitement of the game. For example, an express option to include musical cues could be added, so that the artist's rendition is accompanied by a song or other audible clue that assists the participants to guess the concept in question.

To assist with this function automated music matching logic 150 could be used to coordinate the visual rendering of the epict with the music chosen by the artist. For example if the artist took 30 seconds to sketch a picture of a bird, the music matching logic could be used to automatically select and extract an equivalent (an relevant) 30 seconds of music (perhaps with lyrics masked to avoid explicit rendering of the answer) from a song such as "Blackbird" by the Beatles to present with the epict. The music excerpts can be obtained from any one of a number of online sources, and may be further cropped as needed to accommodate a particular epict. To make their incorporation easier, they can be catalogued by different topic tags, so that they can be identified and selected easily by a human artist. By keeping the music excerpts short the issues of copyright and fair use can be minimized.

As further explained, speech recognition (as described below in more detail) could also be incorporated to recognize participant utterances and assist with scoring.

Figure 2:
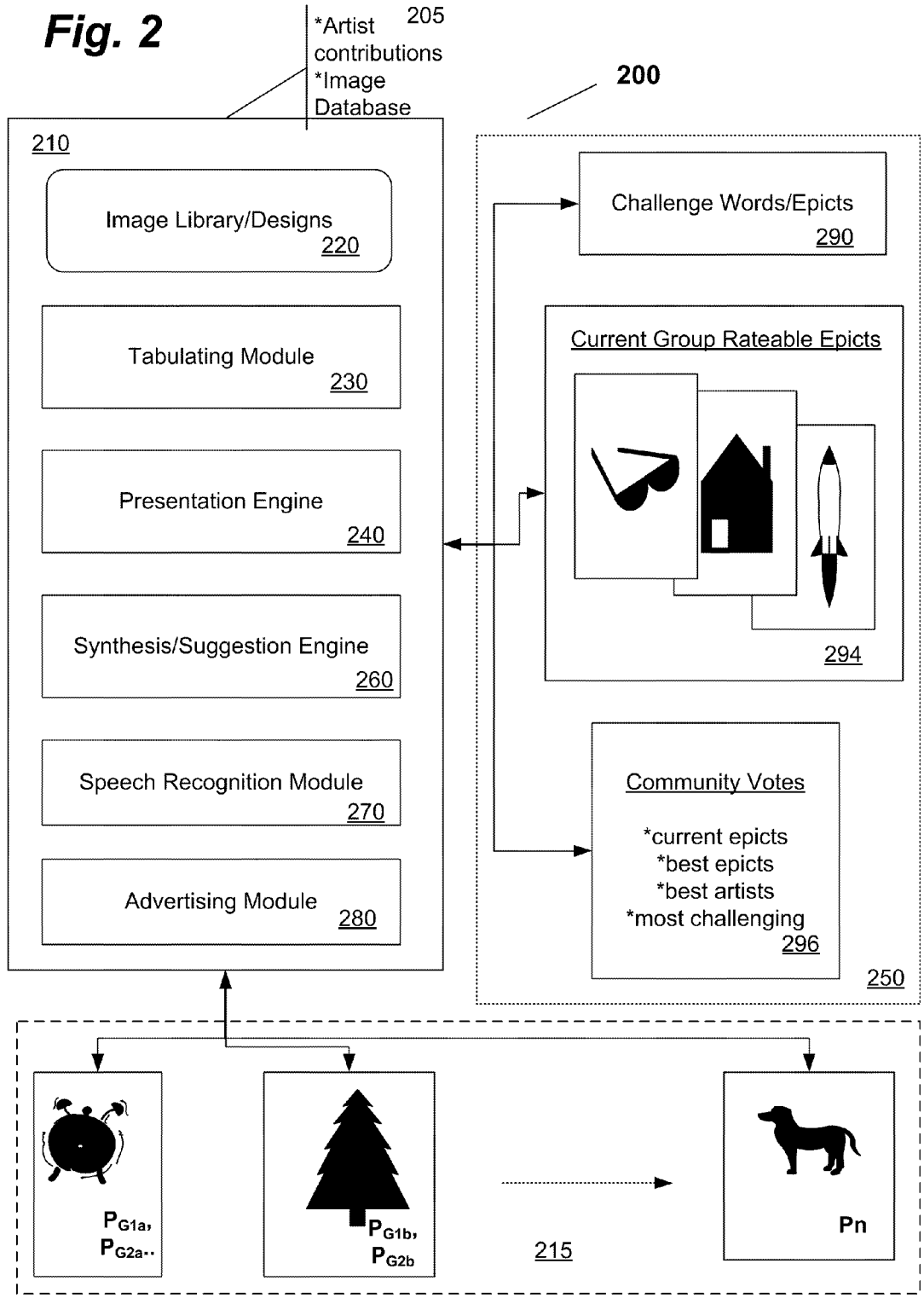
FIG. 2 is an illustration of a second embodiment of a pictorial game implemented on an Internet website.

A second embodiment of a pictorial game 200 implemented on an Internet website is shown in FIG. 2. The components of this system generally include a game module 210 which has access to a database of images 205 for creating a set of epicts 215.

The images 205 can be derived from a number of sources, including community artists' contributions, pictures/graphical content contributed by members, and other image data automatically retrieved from online image repositories (e.g. such as from the GOOGLE® image search engine). In some embodiments the images could be linked from member's other social networking pages (e.g. FACEBOOK®, MYSPACE®, etc.), online photograph accounts (e.g., such as FLICKR®, PICASA®). Details of such compilation are described below in connection with FIG. 3A.

Returning to FIG. 2, the game module 210 includes a number of components, including an image library 220, a tabulating module 230, a presentation engine 240, a synthesis/suggestion engine 260, and a speech recognition module 270. An advertising module 280 can also be incorporated if needed. Each of these routines is preferably implemented as one or more software routines adapted for executing on an Internet accessible server, and capable of interacting with input from client browsers, back end databases, website pages and other similar processing/data resources.

The aforementioned routines are specifically responsible for supporting an Internet website page 250, which includes a number of features and functions for interacting with users of an online gaming site. For example the gaming page 250 could include a set of challenge words/epicts 290; a set of ratable epicts 294, and a community voting section 296. Each of these is discussed briefly here and in more detail below in connection with FIG. 4.

In FIG. 2, the challenge words/epicts 290 represent a set of words—to be drawn by contributing artists and a set of epicts—drawings to be guessed at by other participants. As seen below, selecting this feature allows the member to either invoke a drawing canvass/tool (to create an epict for a specific word) or invoke an image presentation screen (to guess what word is appropriate for an epict concept). Both of these functions are described in more detail below.

The ratable epicts 294 feature allows members to examine specific epict-concept pairings, and rate them on their artistic/creative merit. Thus, for example, this section of the site may be used to view specific artistic renditions of particular concepts. Members may be encouraged or requested to contribute epicts on particular themes, subjects, objects, etc. The ratings are then captured and compiled for community perusal and other purposes described herein. A number of different data collection schemes exist for this purpose and could be used for such purpose, including conventional polling software.

Furthermore the gaming page may include options and features for presenting the various tabulations accumulated by the site for user entertainment. As an example, particular epicts, artists, concepts could be recognized, along with top N lists and the like.

It will be understood that all of the above applications (challenge words/epicts 290, ratable epicts 294, community voting 296) and others could also be implemented by members on an individual basis on their respective web pages. For example the feature could be implemented as a separate application for inclusion within pages of a social networking site, in the same way that Facebook users can incorporate other games or features on their profiles or data feeds. This would allow the concepts of the present invention to be perceived and disseminated to a wider audience.

As seen in FIG. 2, the epicts 215 are preferably stored according to concept, artist, etc. to create a master community database of accessible image content. Each epict is preferably tagged with an artist name (if available), one or more concept (word) tags, and other data described below.

The individual modules responsible for carrying out the main functions of the invention are now described in more detail in connection with FIGS. 3A-3F.

Figure 3A:
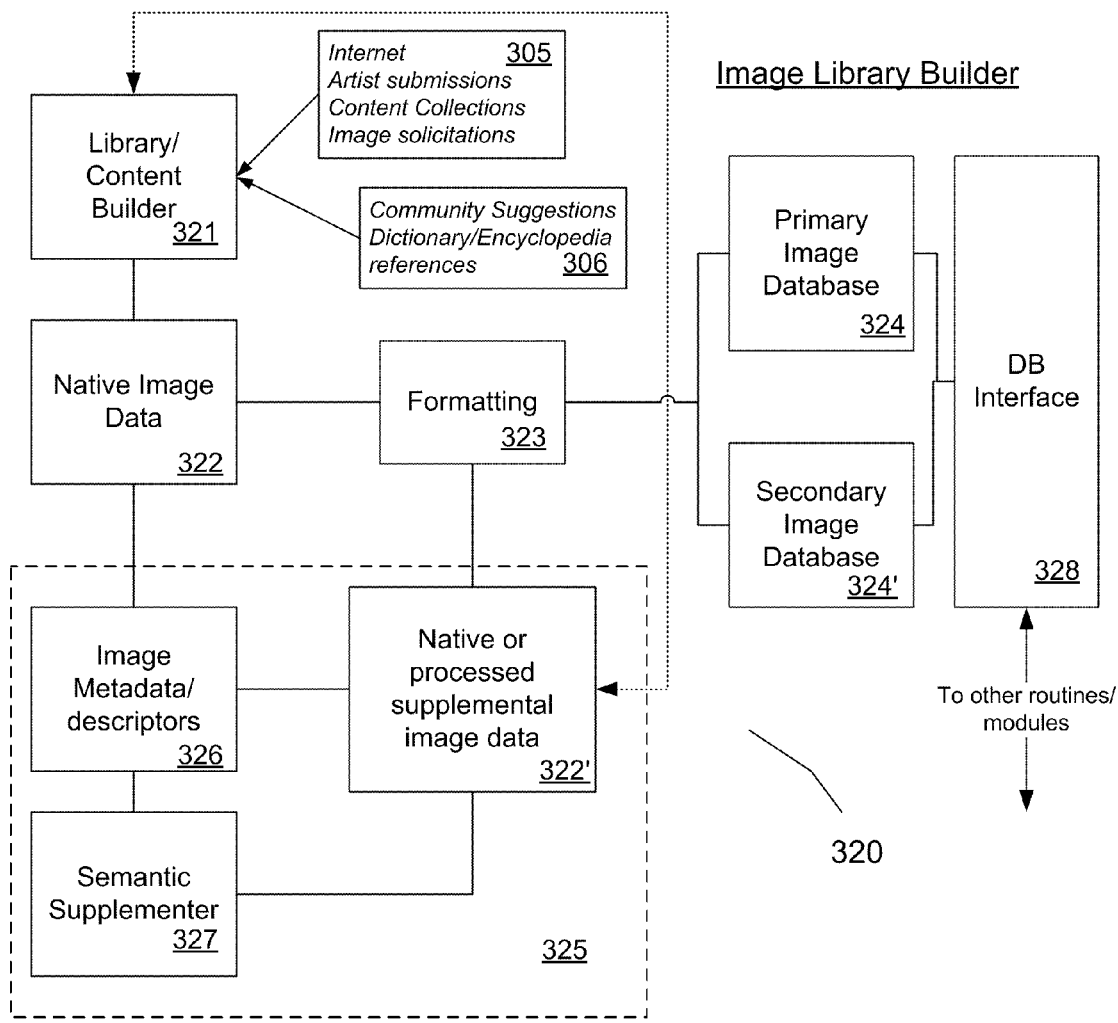
FIG. 3A illustrates a preferred embodiment of a pictorial game image builder.

A preferred embodiment of an image library builder module 320 shown in FIG. 3A includes a number of components for constructing a database of epicts. As seen there candidate images 305 for epicts can be received either through manual contributions or automatic selection from a variety of sources, including Internet collections, private collections, artist solicitations, artist submissions, etc. Candidate concepts 306 can be similarly received manually (through member/community explicit contributions) or through automatic collection/generation from online resources such as dictionary and encyclopedia references. In the latter case, local/topical themes (regional events/happenings) or contemporary themes (holidays, seasonal events) may be employed to augment a list of concepts for artists to consider. Other sources of such data will be apparent to those skilled in the art.

A library/content builder routine 321 retrieves and processes these image and concept/word contributions. The native image data 322 is examined to see if it is compatible with a presentation engine (described below) format, and, if not, it undergoes further formatting treatment by a routine 323 to convert it into acceptable form. A product currently offered by Studiomee titled "Pocket Artist" provides this type of functionality, and other similar products could be used. The Pocket Artist product and Pocket Sketch products are available from the iTunes app store. A similar feature is offered by Sketchmyphoto also available from their website.

For example in some embodiments of the invention an epict may consist not of artistic drawings, but solely of an actual photographic image of an object, such as a bird in a tree. The image file may be filtered and reduced (in terms of visual features) to render a simplified version of the image that can be broken down into discrete components. For example all the background elements of the image could be stripped out to show only the bird itself. Then the image could be divided—logically or physically—into distinct regions that are further reduced in complexity, so that, for example, only basic features and outline of the shape of the bird remain. These basic features thus make up and are then used to synthesize the image in later renditions of the epict. Various forms of conventional picture processing software are capable of this type of operation and could be used for this purpose. For example the ADOBE PHOTOSHOP ELEMENTS® software includes several image "filtering" features (for example the "poster edges" and "fresco" look found under the artistic category, and several aspects of the sketch category (photocopy for example)) that provide this type of capability. The advantage of such format is that it can take up less space and is somewhat more consistent in terms of giving the game an artistic look. An example of an original JPEG photo and an artistically formatted counterpart is shown in FIG. 3G. Even in the black and white reduced version the image is still recognizable.

Nonetheless it is possible to use simple JPEG (or similarly compressed data formats) for visual images if desired. Again the precise format of the epicts will be a function of the specific design goals and is expected to vary from application to application.

The images are also processed by an image supplementation module 325 which is used generally to locate other associated and relevant content for the candidate image as part of the pictorial game. For example metadata routine 326 is adapted to identify/extract appropriate content tags. The content tags represent correct responses or answers that may be associated with the epict in question. For example a picture of a cat may be tagged with the descriptors "cat," "pet" "purr" and so on. In some cases such data may be explicitly provided, in others it may be determined by reference to various software tools available on the market for identifying the nature of objects shown in an image.

A semantic supplementer routine 327 examines the tags/descriptors and other concepts and determines other semantically related concepts and words. Thus for example, in the above example, the "pussycat" and "feline" may be determined (with reference to a reference semantic tool such as WORDNET®) to be semantically related to "cat." Based on such association additional text tags could be appended by a routine 322' along with other native or processed supplemental image data associated with the content of such additional text tags. Thus, for example, if image data already exists for such semantic relatives, it can be associated with the candidate epict in question for use in the game.

The completed epict is then stored in a primary image database 324, along with the other associated metadata/parameters noted above. A secondary image database 324' contains related images that can be accessed/related as desired to the entries in the main database. A database interface 328 is used to query and access epict content as needed by other routines as described below.

A preferred embodiment of an epict record 329 is also shown in FIG. 3A. Each epict is preferably coded with the following parameters:

- a unique image ID (a numerical designation of any appropriate length);
- an image name—(a listing of the appropriate content tags, descriptors, etc.);
- image components (some images may be stored in a format where the artist's rendering of the image is journaled into distinct components; in other cases the contributions can be automatically rendered into components by formatting routine 323);
- image component timing (in instances where multiple components exist, timing information can be provided to indicate what component should be drawn first, second, etc., and at what speed);
- related image components (as noted above, a pointer to other secondary images in database 324' that can be associated with the epict);
- Origin ID (a reference to an artist, data source or the like from which the epict was derived)

The preferred approach uses a scheme in which the electronic image is presented in a visual sequence that substantially tracks a predicted rendering of such used by a human composer. In other instances where the content is not based on a human artist, the image can be presented visually as the system predicts a human artist would render it, or in a manner that is logically related to the subject matter of the image.

Those skilled in the art will appreciate that other parameters can be included as well depending on the application and desired functionality. For example some epicts could be tagged with automatic metadata (geocoding, time, etc.) as desired, along with additional pointers to appropriate musical relatives (as noted above).

A preferred embodiment of the process used in a pictorial game image presentation engine 340 is depicted in FIG. 3B. As alluded to earlier, the present invention can be implemented in various forms. For example, in an automated mode, the epicts can be drawn from database 324 and presented within a portion of an interface for a webpage to be reviewed and evaluated by individual members. The members preferably have the ability to select (and/or subscribe to) the epicts by category or topic. The members could then participate in a solo-type interaction with the game through these individual epicts. Individual members may elect for the epicts to be presented on their respective profile pages as a customizable widget in accordance with one or more programmed themes of their selection. For example a particular user may direct the epict engine to randomly select topics based on the news of the day, so as to cause the system to dynamically present epicts directed to such concepts on his/her site as such content develops over time.

In other applications nonetheless it may be desirable for members to participate in epict presentations/guessing in a team based mode. In such instances members may elect to join and sign up as a team in accordance with a set of rules as shown at 341. Invitations and sign-ups can be implemented with any number of known tools. The rules may be based on the particular game chosen so that for example teams may play directly against other teams, or in some cases, may simply compete against a reference set of epicts. Other formats are of course possible. The rules may further specify scoring and other game options shown below as well.

The game is then initiated at step 342 for the participants in question. The participants may enter the game directly by reference to a game ID, an authorization token or similar mechanism known in the art. In one embodiment the teams are expected to review/create a number of separate epicts on a rotating basis. That is, a first team would create a first epict for a second team to is guess within a certain time period, and vice versa. The game can consist of a plurality of rounds (again selectable by the participants) in which different epicts are provided to the respective teams. The game final scoring can be based on any desired mechanism, such as by determining the most correct guesses made for a set of N epicts. Other rules and variations can be used as well.

In a preferred embodiment the game members can view the epicts on their respective client devices (which may be a PC, a cellphone, a PDA, a game console, etc.) in accordance with image data/game formatting requirements at step 343. As noted earlier the participant may also be shown additional supplemental images derived from a main epict to assist in guessing the concept in question. For some embodiments of the games the teams can be presented epicts that come from a common library database 324, while in others the epicts are created during game time by the participants themselves. Again other modes are contemplated by the present teachings and the participants can be given latitude to select a particular rule set.

In those cases where game participants are required to create their own epicts on the fly, a variety of different software tools can be used to assist them as needed to comply with a game selected concept that they are asked to compose. These types of tools are again well-known in the art; one example is a software application known as Graffitti that is offered on the FACEBOOK® site, and which presents a graphical interface for creating drawings for community review. See e.g. (h-t-t-p://)apps(dot)facebook(dot)com/graffitiwall/and h-t-t-p://apps(dot)facebook(dot)com/graffiti/ An adaptation of this product also allows replay/journaling features and this function could be incorporated as well with the present invention. Thus this product (or something equivalent) could be used both for creating and storing epicts for later use (as seen in FIG. 3A) or for permitting participants to create content as required for a particular game. In the case of using "canned" epicts the individual replay components and timing could be stored as part of epict record 329 as noted above. For example there may be variable parameters on how quickly the epict is drawn. That is the ratio of how much drawing time is involved relative to a maximum time allowed is for recognition of the image can be adjusted based on a desired game difficulty. Another example of a drawing tool that may be appropriate for the present invention is described in US Publication No. 2007/0016689 incorporated by reference herein.

On certain platforms, such as the IPHONE®, additional sensors could be exploited to render the image in different modes/styles. For example the IPHONE® contains motion sensors which can be used to determine the attitude of the device. The epicts could be encoded to have motion based components that are only expressed as the device is moved. For example, a picture of a tree could be coded so that it moves in response to the phone being moved. This could help denote the concept of "wind," which is otherwise difficult to conceptualize in a static drawing. A picture of a hockey puck could be shown in different positions as the device is moved, to denote the concept of sliding, and so on. A series of different images, representing scenes active at a different orientation/rotation angle of the device, could be used to denote the pouring of water, such as from one container to another. The use of such variable position technique would be most advantageous in connection with concepts involving verbs, actions, etc. The possibilities are endless in this respect, and other examples will be apparent to those skilled in the art.

The artist participants may similarly be given clues/cues and other forms of explicit assistance to help them create the pictorial images. The suggestions may be as simple as providing additional semantic word cues that are perhaps easier to depict visually. Alternatively they may be as complex as providing specific objects as templates to work from. For example for a dog the system may provide a basic body of an animal with four appendages, allowing the user to construct the rest of the image on his/her own. This technique can help solve the case of "drawing"/artist block for people who don't know what to use as a starting point.

As alluded to above, some embodiments may benefit from the inclusion of musical clues that are associated with the epict, and this feature can be further used during the presentation to assist in decoding the images.

At step 344 the responses are logged from the game participants (in the form of guesses, epicts, etc.) It will be apparent that in some cases the raw ratings data feed to be tabulated for the game can originate from a standalone architecture (see data feed 140) as described in FIG. 1 above. Moreover it should be apparent that the participants do not have to be physically in the same location to participate as a team.

Again in FIG. 3A, the participant winners and associated prizes are determined at 345 by a decision software module using any desired set of rules, i.e., such as by guessing the exact word (topic/concept) or a semantic variant as noted below. At 346 the game status/score for each participant team is adjusted as well in accordance with the rules elected for the game. The performance of the participants/teams/epicts/artists is then logged and tabulated at 347. This data can then be published as an update or feed if desired to search engines, profiles and other social networking sites.

The contributors of the content (artists, image sources, etc.) are then recognized at step 348 based on the use of the epict and/or a rating provided therefore. In embodiments of the game where some form of accounting is given to such entities a database can be maintained of credits or funds for each contributor.

As another option the presentation engine can use a collaborative filtering or corroborative filtering routine to identify other epicts or artists that would be of interest to the game participants based on their rating or adoption of an epict/artist. In other words, the system can correlate epicts based on artist, content tag, score, etc., so that participants can be shown other examples of epicts likely to be of interest based on their scoring for one or more game epicts. Similarly the participants can be given information on other artists likely to be of interest based on scores given to a particular contributor by other participants.

This information could be compiled on a topic by topic basis as well for further refinement. Recommendation routines are well-known in the art and can be modified to accommodate any and all of the data types referenced above for the epict entries 329.

Again, all of the feedback data above, including scoring can be used in the architecture of FIG. 1 above as well.

The right hand side of FIG. 3B shows other game entry points for the presentation engine 340 captured from a game site (or participant) webpage. For example image challenge selection logic 350 is responsible for selecting a particular epict to be used within a particular game or widget. To make this determination it can examine collective community ratings for one or more epicts, consider contemporary/local topics, etc. to select one from database 324. In other embodiments the epicts could be rotated or randomized on a topic basis, an artist/source basis, etc. In still other applications the challenge selection logic 350 can make use of geospatial information to tailor the content of the challenges to a particular location where the user happens to be (in the case of a portable application). For example, in a baseball stadium the challenges could be geared to guessing the identity of players, and so on.

In some applications a CAPTCHA challenge system (not shown) could introduce visual content to be reviewed by humans to determine what appropriate tags/concepts are presented for the image in question. This information can then be used to augment a library of challenge test images. For example the challenge system could determine that an (intentionally visually distorted) image A is nonetheless identified as either X or Y by 90% of the population, thus making is suitable for inclusion in a CAPTCHA system. The image could be re-presented at various times to different participants/Internet viewers—and with different levels of degradation—until it is no longer recognized by a certain percentage of the population. This process could be repeated iteratively—with progressively degraded versions of the image—as needed to meet the CAPTCHA system's requirements. The recognition times could also be measured for each iteration. In this manner the present invention can act as a form of testing ground for these types of challenge systems.

An optimized set of image challenges could be presented on an IPHONE® like device as part of a CAPTCHA to gain access to accounts, data, computing resources, etc. The user would be asked to provide the identity of the image is either through a keyboard, or, if desired, audibly using speech recognition. The latter affords an additional layer of protection against would-be fraudulent accesses.

In still another embodiment, a CAPTCHA challenge for an IPHONE® type portable device (capable of motion/orientations sensing of the device) can be based on providing hints or clues to a user on how to move or orient such device. That is, the CAPTCHA could provide either text on a display, or audible instructions to the user on how to manipulate the portable device, such as rotating it to the right, to the left, in a complete circle, picking it up and putting it down N times, shaking it in different directions, etc., etc. as part of a CAPTCHA challenge. For example the current version of the IPHONE® has a built-in compass; the user could be asked to orient the needle to point to a particular location (N, NE, E, SE, S, SW, W, NW and so on.) In other instances the user may be asked to move the device so as to cause some action in a scene, such as to make water pour from a cup, and so on. Thus the manipulation of objects within the screen can be done as needed in a challenge based on sensing the movement of the device.

Figure 8:
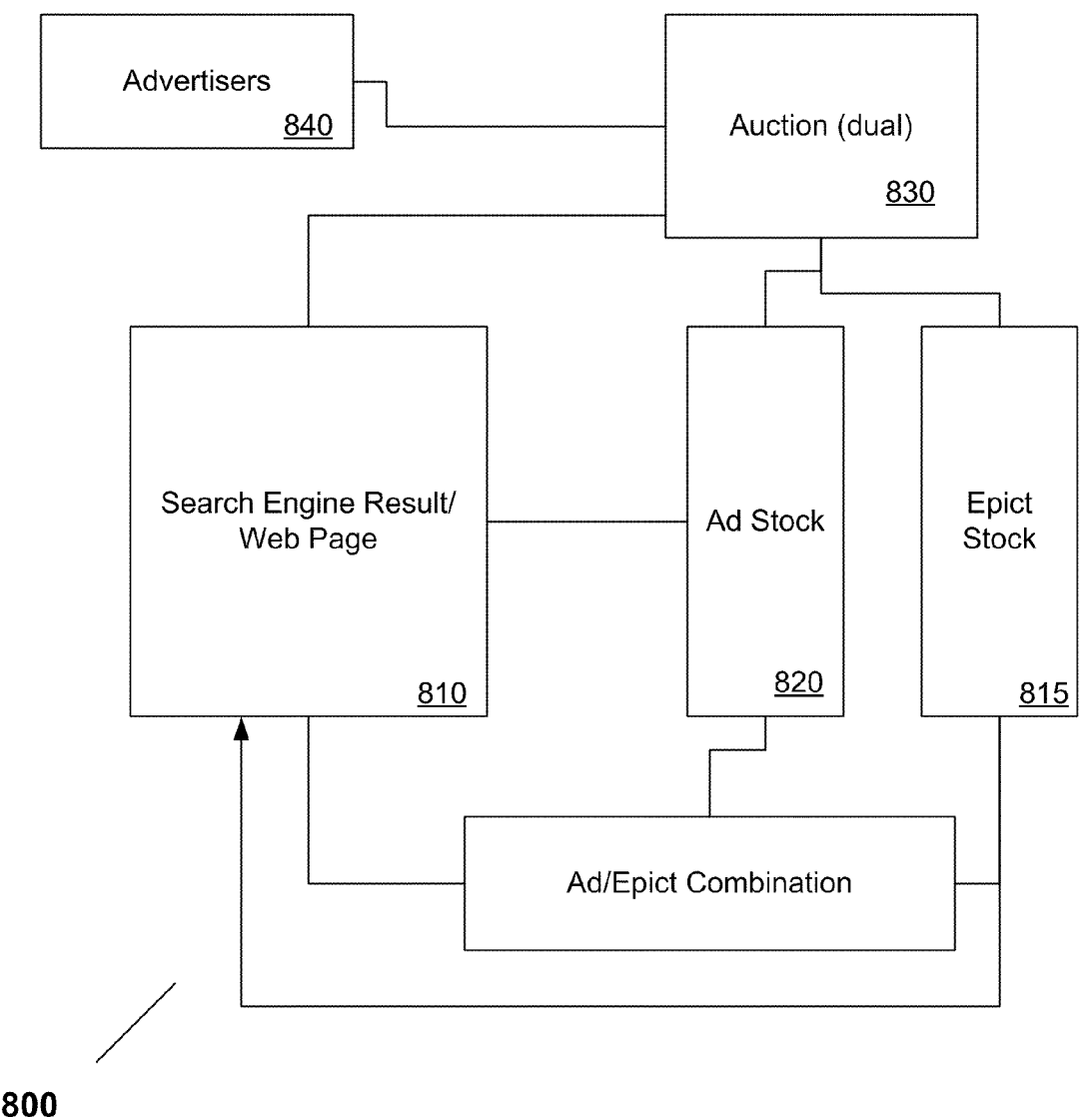
FIG. 8 depicts a process for integrating advertisements and epicts in accordance with the present invention.

In other cases the CAPTCHA can include a visible image indicating the movement to be imparted to the device, such as showing a person rotating it 90 degrees, picking it up and down, moving it in a FIG. 8 pattern, etc. Again the image could be progressively revealed or degraded if desired. Skilled artisans will appreciate that there are many options for the physical manipulations and the invention is not so limited.

The touchscreen on an IPHONE® like device could also be integrated into the challenge so that the user is required to physically touch or manipulate icons or other objects to achieve some result. For example the user could be asked to arrange a set of letters in a sequence to spell a particular word in a particular location on the screen. Alternatively the user could be asked to orient an object into its correct position by moving it with their fingers such as described generally in the article "What's Up CAPTCHA? A CAPTCHA Based On Image Orientation" by Gossweiler et al. (WWW 2009, Apr. 20-24, 2009, Madrid, Spain) incorporated by reference herein—or by moving the device. Those skilled in the art will appreciate that other physical manipulations could be employed, including blowing into the phone's microphone (as is done in some games), etc. The challenges could be used, as noted, for accessing computing resources, accounts, etc., and even for applications such as unlocking/accessing the portable device (i.e., like a secret handshake).

Returning to FIG. 3H, an example of the types of degraded images is shown therein. The same image as FIG. 3G is shown with different degrees of pixelation, again using the basic operational tool available with ADOBE PHOTOSHOP ELEMENTS®. At one level of extreme pixelation (created using a variable colorhalftone filter feature) the image is not recognizable; but at lower levels the image can easily be distinguished as a bunkbed as in the original. Similar effects can be achieved using filters such as crystallize, mezzotint, mosaic (and several image noise and threshold options) all of which can be experimented with using routine skill to devise samples which are recognizable by humans but (preferably) not machines. For example FIG. 3J shows an original JPEG image that has been subjected to various levels of noise filtering, either through removing noise (at different pixel levels) or addition (at differing percentages). It can be seen that at some thresholds a human would have a difficult time perceiving the object in the image, but there are clearly levels at which the image is decipherable. The images therefore could be subjected to different levels of pixelation/signal processing treatment on the fly, or they could be stored as successive original files in the different degraded forms for ease of computation/presentation.

At step 351 the selected epict is presented on the game website (or member widget) in accordance with a set of game rules applicable to such site. User ratings and responses are collected in a similar fashion at step 344 as noted before for the team embodiment.

In this manner the presentation engine 340 can accommodate and incorporate content contributed by participants across a wide variety of input platforms and game environments. All of the aforementioned steps in FIG. 3B is can be implemented using one or more software routines using ordinary skill in the art based on the present teachings.

FIG. 3C illustrates a preferred embodiment of a pictorial game tabulating module 330. This module is generally responsible for compiling data and scoring for the epicts, participants, teams, etc., publishing results and accounting for results of epict games.

As seen in seen FIG. 3C, a routine assigns each pictorial game an ID 331 to identify it uniquely for tracking purposes. For each game, a set of epict IDs 333 and participant IDs 334 are maintained. The epict scores and participant scores are further stored by a routine in respective databases 332 and 332'.

A routine 335 also calculates epict and participant scores. The scoring can be based on any number of criteria, such as in the case of an epict, the fact that it was recognized, the amount of time required, what rating was given to it, and the mode of presentation used (static or dynamic replay). The participants can be scored in a similar fashion, such whether they successfully recognized an epict (by identifying one or more correct concepts), the amount of time required by the participant to make the guess, what rating was given by the participant and the mode of presentation used (static or dynamic replay). These are but examples of course, and other types of data could be collected as needed.

A separate routine 336 also calculates author/source scores to be stored in an artist database 332". This scoring can be based on the same parameters described above, so that, for example, artists are rewarded based on positive ratings given by participants.

The results from the pictorial games (whether they be home based, or based on team games, or derived from Internet sites, widgets, etc.) are published as desired by a routine 337. The results may include other aggregate calculations, including image difficulty rankings, image ratings, group image ratings, author ratings, participant ratings, team scores, game scores and similar data. Again the results can be made available to any of the platforms from which the game originates, including an online gaming site or social network profile, home based console system, etc.

The format of the data records maintained in the databases is shown generally in FIG. 3C as well. For example for an image database 332, an epict record 338 may include the following fields:
  Image ID (as noted above)
  Presentation mode (whether it was displayed statically or using a slow motion replay)
  % identified within time (number of participants who correctly guessed the concept of the epict divided by total viewers)
  Mean recognition time (RT) (the average and/or mean times for recognizing the epict)
  Standard deviation RT (basic statistical data based on recognition times)
  Ratings Score (average score across all participants)
  Difficulty Rating (numerical rating given by participants to indicate how hard it was to decipher the epict)
  Demographic data (information about the participants)

Note that the above is an example of an aggregate record. In addition some of the above fields (where applicable) may be compiled on an individual basis, with each game/rating of the epict given a unique record. Other fields could be maintained in such case within database 332 or an associated database, for example the actual time may be recorded for each epict evaluation. The types of data collected could include other parameters as well.

In addition for the participants, an aggregate record 338' stored in database 332' can include:
  Participant ID (a numerical designation of any appropriate length);
  Images Perceived (which epicts were evaluated)
  Images Recognized (which ones were successfully identified)
  Mean Recognition Time (basic mathematical computation of times required by participant to review epicts)
  SD (RT) (as above)
  Ratings Score (as above, on an epict basis)
  Favorite Authors (list of artists by ID)
  Image IDs authored (list of epicts contributed identified by epict ID)

As above, note the data/fields are for an aggregate record. Some of the above fields (where applicable) may be compiled on an individual basis, with each epict rated given a unique record by score, actual review time, etc. and are maintained within database 332' or an associated database. The types of data collected could include other parameters as well.

Finally, for the individual contributors/artists, the following type of aggregate record 338" could be maintained within database 332":
  Author ID (as above)
  Image IDs (as above, indicating which epicts created by this artist)
  Average Images Recognition Score (compiled across all epicts)

Mean Recognition Time (across all epicts)
SD (RT) (across all epicts)
Author Score (an average rating provided by participants)
Working on image challenge (indicating what contest they are working on)

As above, note the data/fields are for an aggregate record. Some of the above fields (where applicable) may be compiled on an individual artist basis, with each artist having a unique record by epict rated, so that an actual epict score, review time, artist score etc. are maintained within database 332" or an associated database. The types of data collected could include other parameters as well.

While not expressly shown, it should be noted that team scores/data can be maintained as well in essentially the same fashion as for individual participant scores noted above. The data for such teams can be published as desired as well to appropriate authorized entities.

Again it should be noted that these data fields may be varied from application to application. It may be desirable to compile averages rather than means in some cases, and so on. The particular parameters will vary depending on the desired functionality. All of the above data can be published in appropriate form by routine 337 in any number of different locations, formats, etc., for participant enjoyment.

Figure 3D:
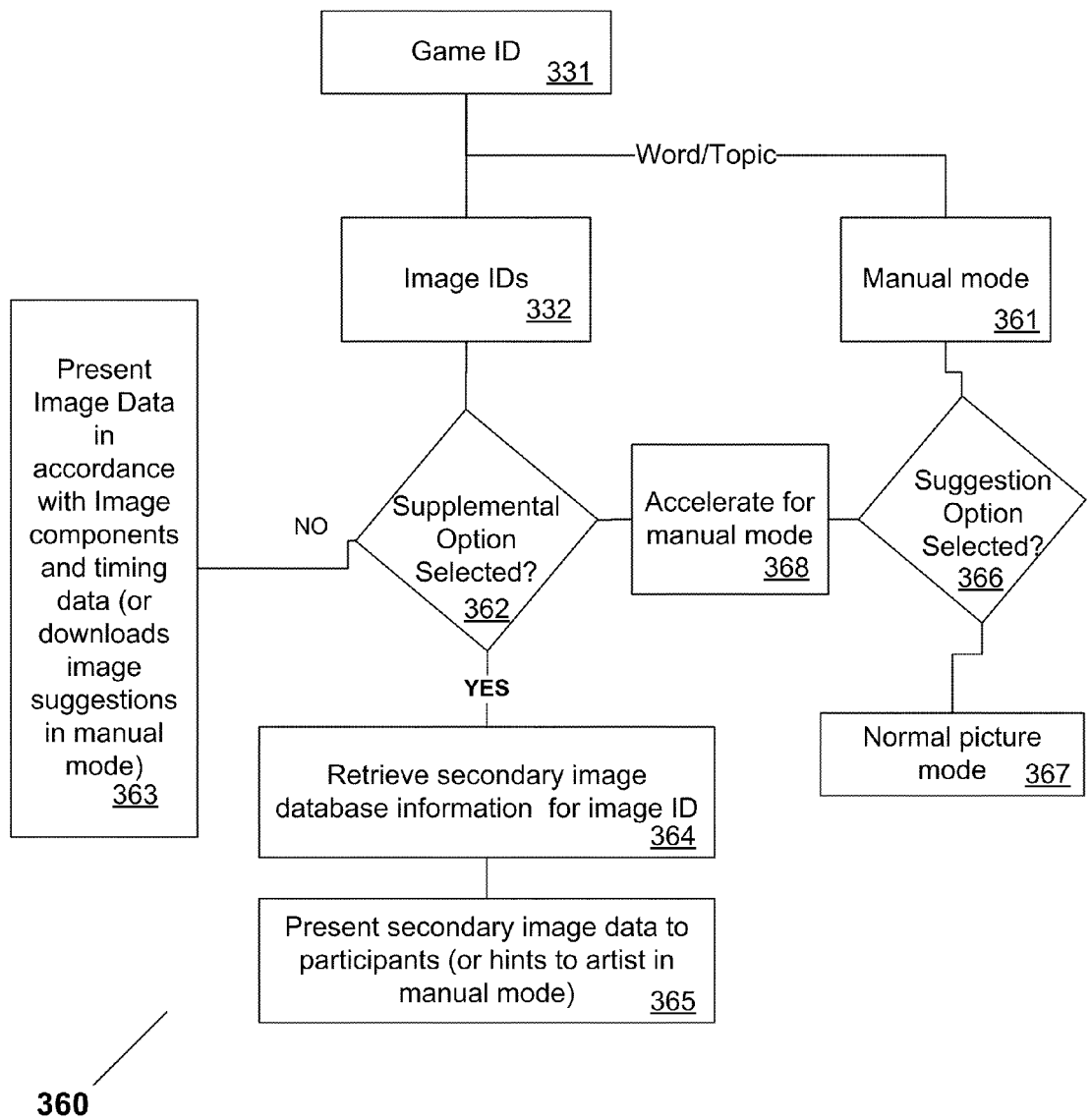
FIG. 3D illustrates a preferred embodiment of a pictorial game synthesis-suggestion module.

FIG. 3D illustrates a preferred embodiment of a pictorial game synthesis-suggestion module 360. This feature of the invention is responsible for assisting game participant artists to compose epicts, and to facilitate presentation of so-called preformed/canned epicts to participants.

As seen in this figure, based on a game ID 331 a determination is made whether the game is to be run in an automatic or manual mode. In the former case image/epict IDs 332 are obtained automatically from a database 324, while in the latter case a manual mode 361 requires a game participant to create the epicts in accordance with the details noted above (see FIG. 3B).

In either event the game participants have the option at step 362 to elect a supplemental presentation. This feature, as noted above in connection with FIG. 3A, allows for additional secondary images and other cues (from database 332') to be retrieved at 364 and presented as part of the reference epict at step 365. In a manual mode this information can be hidden from the participants and shown only to the artist to assist the latter in formulating appropriate images. If the supplemental option is not elected the image data is presented at 363 in accordance with any component/timing information associated with the epict. It should be noted that the automatic mode noted here would be the default option for any epict games/presentations made in connection with a website/web profile implementation since artists are typically associated with team play.

In the event a manual mode is used at 361 for the game the artist can nonetheless invoke a suggestion option for the concept at 366. If the user selects such feature the game play routes through the same steps above, except that in addition to the supplemental option features the designated artist is given specific suggestions on images that could be drawn to communicate the concept in question. If the option is not chosen the image is simply presented in a normal picture mode at 367.

All of the aforementioned steps in FIG. 3D can be implemented using one or more software routines using ordinary skill in the art based on the present teachings.

Figure 3E:
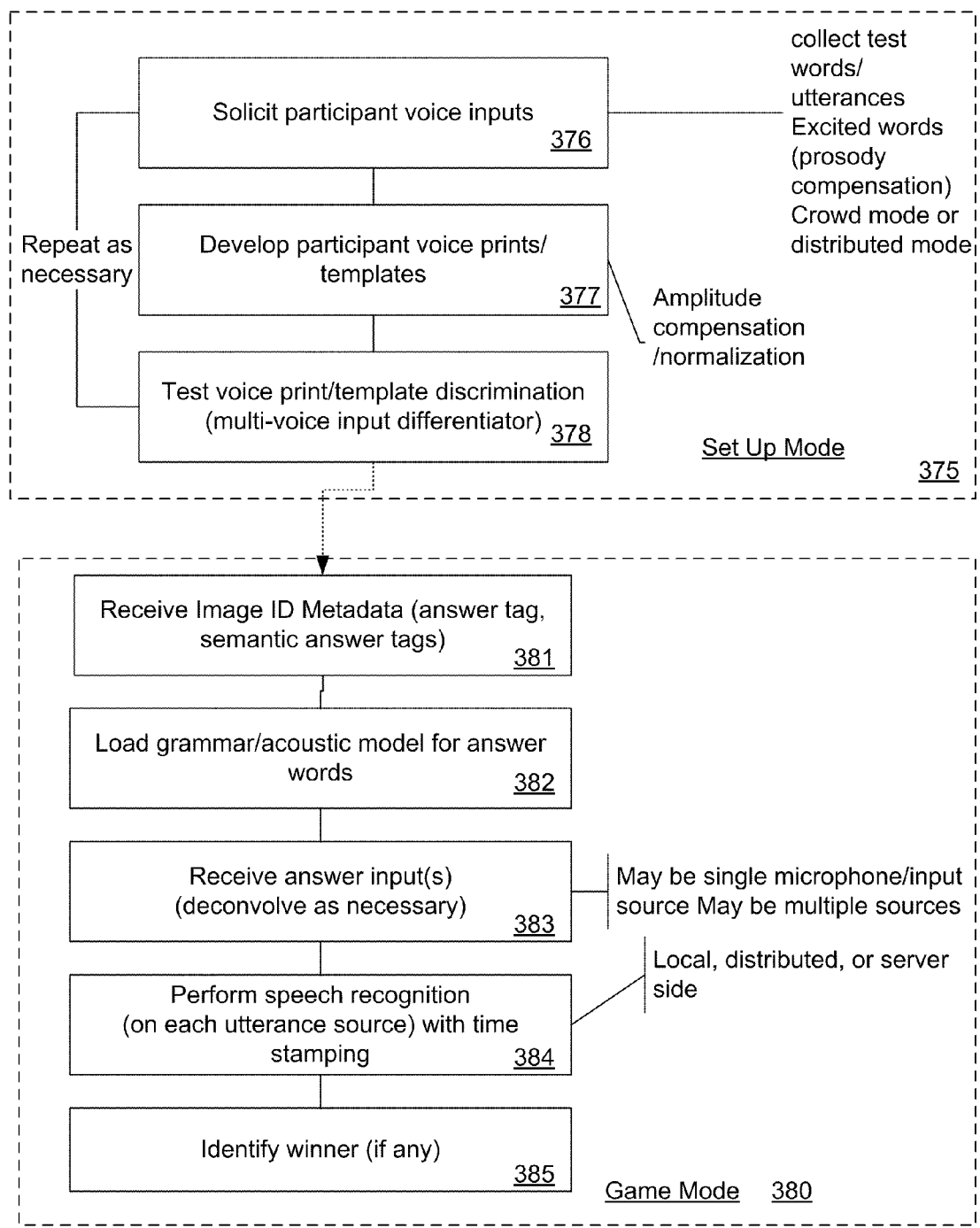
FIG. 3E illustrates a preferred embodiment of a pictorial game speech recognition module.

Next, FIG. 3E illustrates a preferred embodiment of a pictorial game is speech recognition module that can be used in some embodiments of the invention. While this module is depicted in the context of a pictorial game it will be apparent to skilled artisans that it can be used in connection with any number of online games.

As noted above in FIG. 3B, participants guessing on the concept embodied in the epict typically provide input on such using a keyboard or mouse. Another option however is the use of speech data from the participants. This feature has the advantage of most duplicating the prior art game experiences and frees the participants from the task of being distracted while analyzing the image data. Other benefits are apparent as well, including the fact that the participant voice prints collected by the module can be used for authentication and access verification as well.

The recognition module 370 executed two basic procedures: a set up mode 375 and a game mode 380. In the first mode, a routine solicits participant voice inputs at step 376. This can be done in any conventional fashion, including by collecting test words/phrases, examining for prosody, and accounting for background noise attendant at the participant's site. In situations where more than one participant is present at the client device for presenting guesses a "crowd" mode can be employed. Furthermore depending on the processing resources available to the participant they may elect to have the bulk of the speech recognition performed by a remote server associated with the pictorial game system. Other options will be apparent to those skilled in the art.

At step 377 a set of voice prints/templates are thus developed for each of the individual team members—in the case of a solo game of course, only the user invoking the game need provide a template. If a number of players are present at a particular location, it may be desirable to provide some form of amplitude compensation/normalization to account for different participant speaking volumes.

An optional step 378 can be used to confirm that the system is accurately discriminating between individual participants. Each participant would be permitted to speak a test phrase, for example, and the system would indicate is which person it believes gave the utterance. In the event the system needs further training the procedure could be repeated.

During a game mode 380, the speech recognition module receives metadata for one or more epicts at step 381. This metadata includes a number of content tags describing the object of the epict, and may include a number of different semantically related words.

Based on these "answer" responses an appropriate grammar and/or customized acoustic model can be loaded for the speech recognizer at step 382. At this point therefore the speech recognizer need not be capable of recognizing substantial numbers of words. In fact it need only focus on a handful of words, and thus it can be substantially reduced in computationally complexity because it can ignore all other inputs that do not match one of the appropriate answers.

During step 383 the SR module listens for answers input by the various game participants. In the case of team members distributed across multiple locations the data input to the SR is thus received from multiple sources. In such instances it may be desirable to allocate a dedicated SR resource to each channel to improve performance. The SR module then recognizes and time-stamps each accurate recognition at step 384 to give appropriate attribution to the first participant accurately guessing the epict concept.

Nonetheless even in "crowd" scenarios where the participants are at a single location, recent advances have made it possible to make reasonable resolutions of individual speakers who are speaking simultaneously. See e.g. h-t-t-p://technology(dot)newscientist(dot)com/article/dn14105-robot-asimo-can-understand-three-voices-at-once(dot)html incorporated by reference herein. By using a similarly configured console or game platform with appropriately located microphones a SR module could distinguish between multiple human speakers articulating their responses at the same time. Other known tracking techniques for identifying the correct speaker can also be employed, such as by using video and other input.

Upon receiving a correct response the routine would identify a winner at step 385. This feature allows the participants to express their answers rapidly is and in free form without the need for slower, more cumbersome data entries. It is expected that this form of input would be far more preferable in embodiments of the invention where individual players desired to play the game over a portable device, such as an Iphone or similar device that includes speech capability built in. In such instances the grammars/dictionaries can be downloaded directly to the device (since they need only pertain to the universe of words associated with the concepts) to allow untethered (non-network) play in situations where the recognizer functions can also reside on the portable device.

Figure 3F:
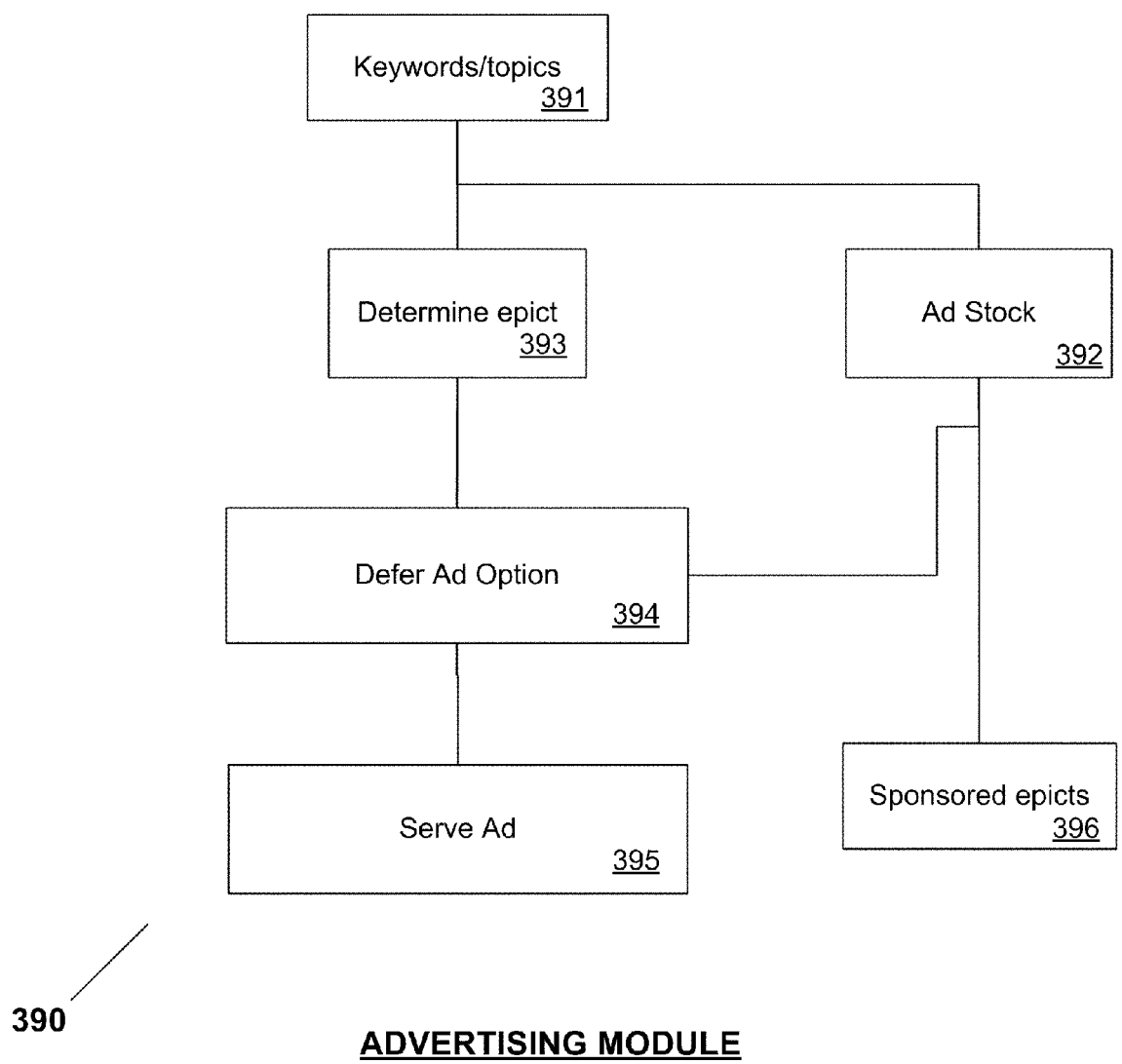
FIG. 3F illustrates a preferred embodiment of a pictorial game advertising module.

FIG. 3F illustrates a preferred embodiment of a process employed by a pictorial game advertising module 390. This process basically can be an adaptation of a conventional keyword auction based algorithm such as the type used by such entities as Google, Inc., Yahoo! Inc., Microsoft, Inc., etc. In this instance, therefore advertisers are permitted to bid on a keyword or topic basis at step 391. In the present invention the keywords/topics are preferably based on the epicts and related metadata (concepts/words and semantic relatives) stored in databases 324, 324' (FIG. 3A). Thus the advertising stock 392 is preferably served on an epict by epict basis at step 393. In this fashion a content based matching system can be implemented between advertising stock and the content of the epicts.

Since it may be undesirable to serve ads which have content that may communicate (and thus spoil) the epict recognition process by players (since it may be related to the topics/concepts of the epict), it is possible to switch off the serving of ads as noted at step 394 until the epict has been recognized or the recognition time has passed. This would avoid the problem of players being given hints as to the identity of the epict. Other techniques could be used.

At step 395 the ad is served based on the advertiser's stock 392. It should be noted that in some cases it may nonetheless be desirable to incorporate advertising while the epict is being drawn as a mechanism for assisting the recognition process. In this embodiment, the ad is in fact assisting the player to solve an aspect of the game, a feature unlike other advertising modules used in the art.

This concept could be further enhanced by integrating other user contributed content directly into the ads. For example one mode of the game, as noted above, involves a suggestion component intended to assist players determine epict concepts. An ad which directly incorporates an epict determined to be related to (or suggestive of) the epict in question could be used to present the suggestion explicitly on the participant's screen while they are playing the game.

Figure 4:
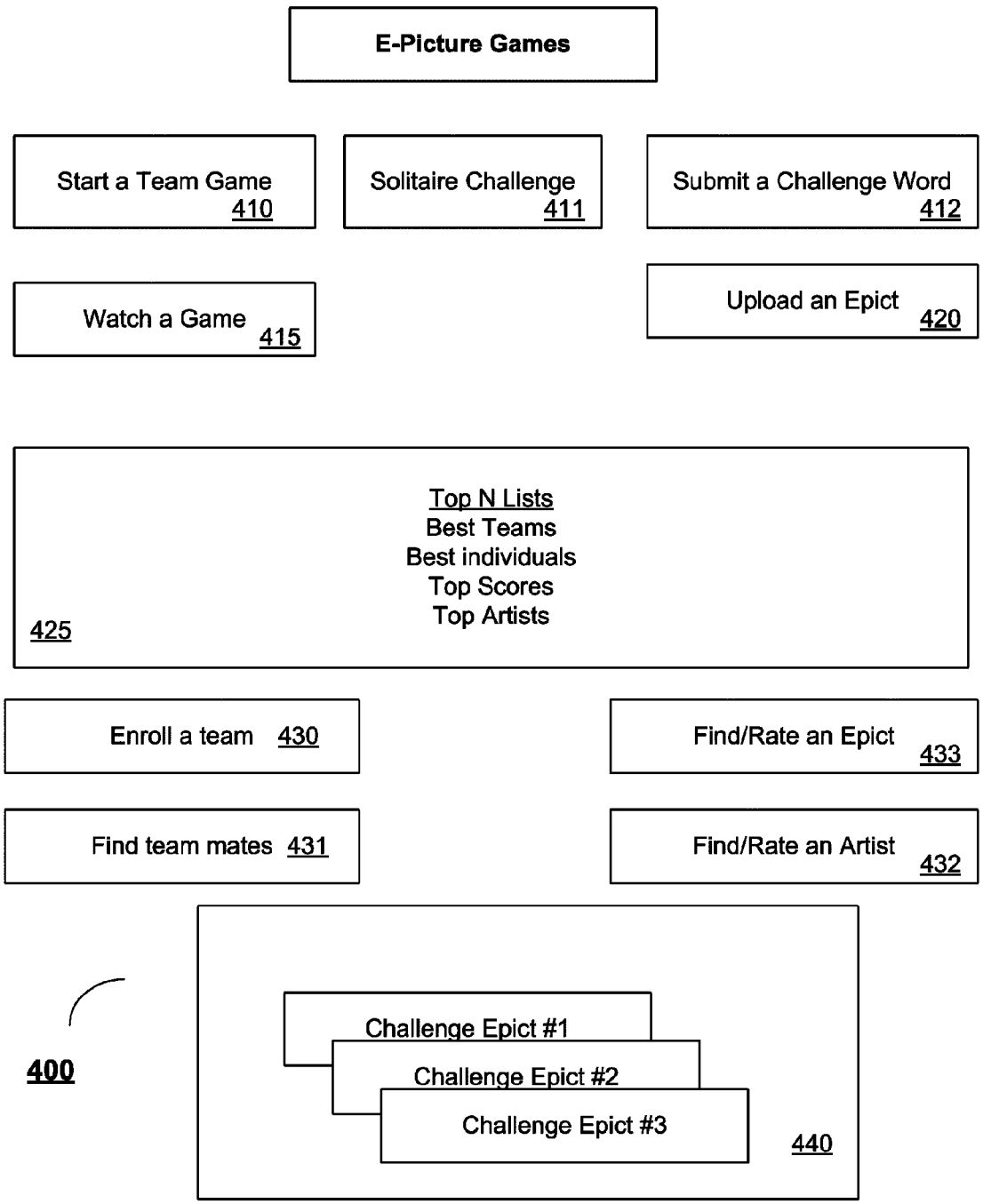
FIG. 4 depicts a preferred embodiment of a pictorial game website.

This collaboration between advertisers and artists can be extended at step 396 so that particular artists/epicts can be essentially "sponsored." For example, as seen in FIG. 2 (epicts 294) and FIG. 4 (epicts 440) the identity/stock of epicts chosen for presentation within the web pages can be determined by advertisers who match their advertising stock to one or more epicts that they want to be associated with. In this respect, therefore, the epicts effectively act as web assets (akin to a web page in an Adsense campaign) that advertisers can bid to be associated with. By allowing advertisers to bid on specific assets (instead of queries, or web page content) the invention provides another angle for monetization of such assets and opportunities for advertisers.

The advertisers could in some cases be allowed to introduce their own proprietary/customized epict content as well (to the image library) to enhance the appearance of the game and increase their exposure. They may also contribute their own list of concepts, topics, etc. to be used as part of the game. Combined with the dynamic serving of ads related to an epict the invention allows for advertising to be used as an integral and dynamic component of an interactive game.

FIG. 4 depicts a preferred embodiment of a pictorial game website 400 that embodies aspects of the present invention. Specifically, this figure shows a an example of a main web page that would be seen by Internet users accessing a game site. It should be noted that many conventional aspects of such types of pages have been omitted to make the description of the invention clearer.

In particular, the game site offers users a chance to set up and initiate a pictorial game with all the features and functions described above in connection with FIGS. 2 and 3A to 3E. To wit, different portions of such page as presented within a client GUI interface include selectable URLs which invoke routines to permit the user to:

Start a team game (option 410)—allows for a team to start a game against another team using the procedures noted in FIGS. 3A-3E;

Start a solitaire challenge (option 411) allows for an individual to start a game using the procedures noted in FIGS. 3A-3E;

Submit a challenge word (option 412)—used for allowing members to offer concepts/words to be expressed pictorially by other members;

Watch a game (option 415)—allows a member to act as a form of voyeur and observe a team game by topic, locale, team name, etc.;

Upload an epict (option 420)—allows a user to submit their own pictorial content and descriptor tags for the entertainment of the community;

View top N lists for the community/site (option 425)—allows users to see the highest rated epicts, the most difficult epicts, team ratings, artist ratings, participant ratings, game scores, etc.; the difficulty of epicts can be determined by computing a total number of times the epict has been presented versus how many time it has been recognized; artist ratings can be similarly computed; the most difficult concepts to recognize (either individually or by topic) can also be compiled Enroll a team (option 430)—allows a user to set up a new team for play on the site;

Find teammates (option 431)—allows user to find other persons to be part of a team;

Find/rate an artist (option 432)—allows a user to search for specific artists by name, topic, concepts, etc. and rate them if desired Search/Rate epicts (option 433)—allows a user to search for specific epicts by artist, topic, concepts, etc. and rate them if is desired Review/guess on challenge epicts (option 440)—allows users to pick specific epicts/words to evaluate and play with in accordance with game rules.

Again not all of these options are necessary, and other options could be presented and offered as well, and the particular implementation will vary according to game specifications and requirements.

Figure 5:
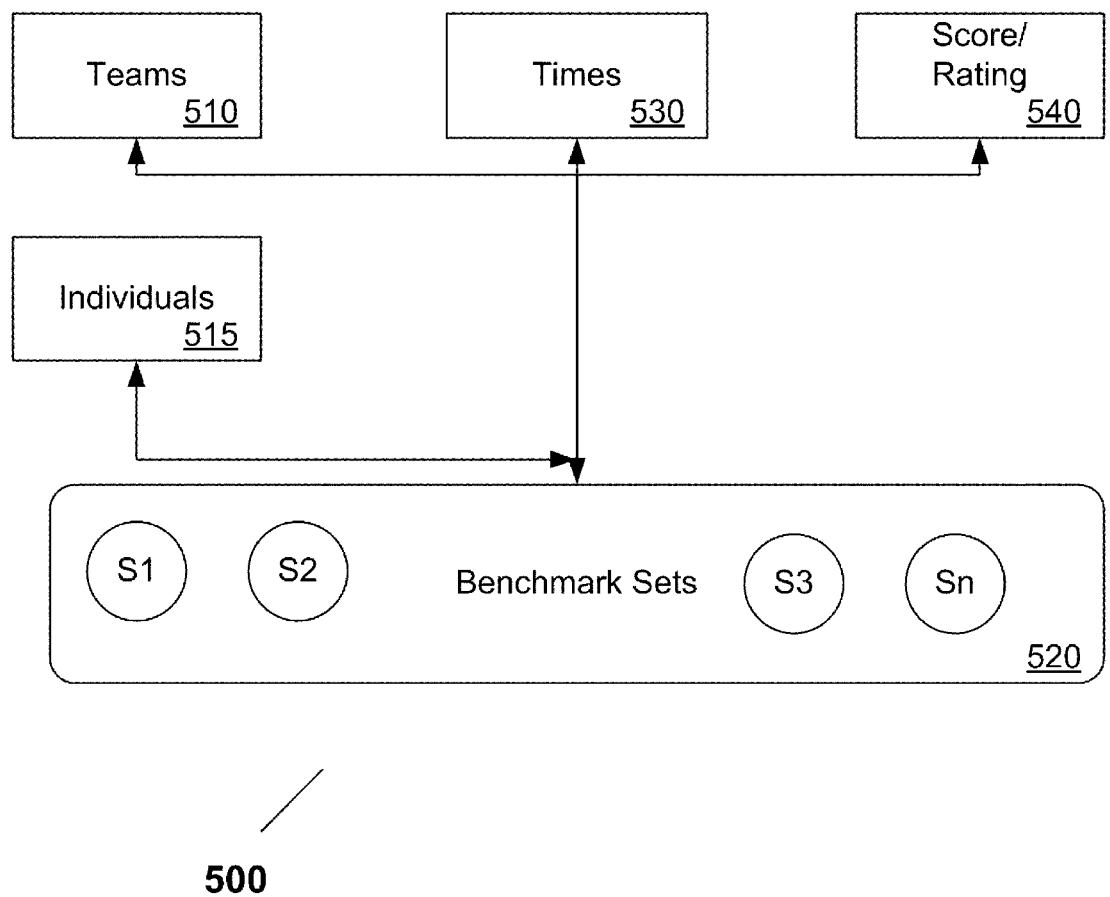
FIG. 5 illustrates a preferred embodiment of a pictorial game team rating module.

Some embodiments of the pictorial game can include a rating module 500 as seen in FIG. 5. The purpose of this module is to allow teams 510 and individuals 515 to access and play with a set of benchmark epicts (S1, S2, . . . Sn) 520 and evaluate their performance relative to such standard for competitive purposes. The benchmark epict sets can be selected by human editors, or automatically by rating module 500 by evaluating ratings/performances of epicts compiled by tabulating module 230.

In the former case, a human editor may select a number (X) of epicts from database 324 based on a ratings list of X different topics. In the latter case the identity of the individual epicts within the sets is determined by reference to some threshold rating for score, difficulty, etc. In either scenario the epicts are preferably selected to expose participants to a cross section of the available inventory.

The participants then work through one or more of the epict sets (e.g. S1) and then have their times/accuracy evaluated by a routine 530 such as that described above for FIG. 3A. Their scores, and the ratings (if provided) for the epicts are then compiled by a routine 540 that, again can be similar to that already discussed above.

This aspect of the invention therefore allows members (and teams) to evaluate themselves relative to some test benchmarks for competitive recognition. The results can be published, as noted earlier, for the entertainment of the overall community, to individual profiles, the main game webpage, or other social networking sites.

Figure 6:
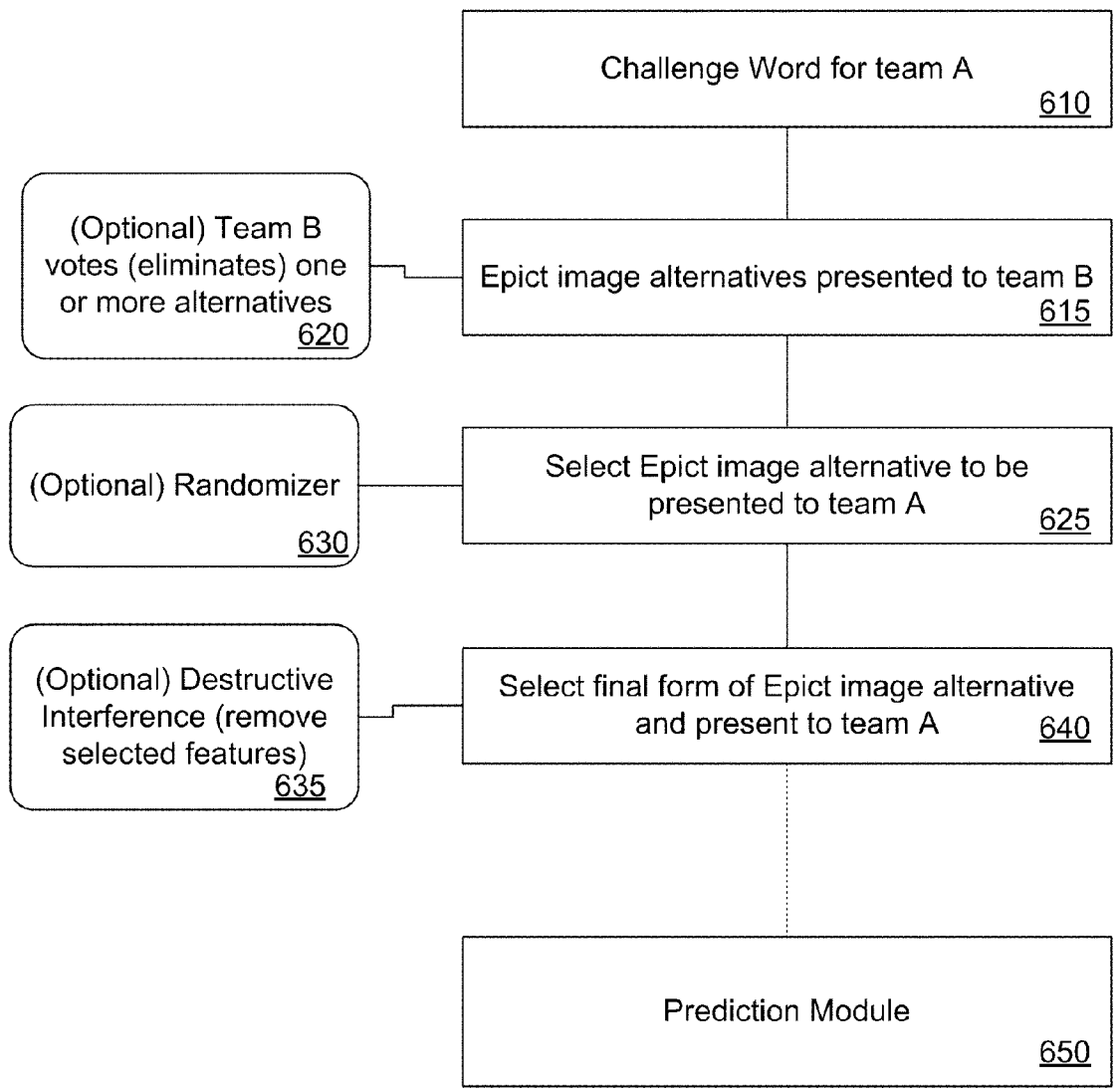
FIG. 6 illustrates a preferred embodiment of a variant of a rule set used in a pictorial game.

FIG. 6 illustrates a preferred embodiment of a variant of a rule set 600 is used in a pictorial game. Basically this figure describes a format that can be employed in some variants of the game to make it more interesting for some participants in team play applications.

In this embodiment a challenge word/concept is selected for a first team (A) by a routine at 610. This may be done randomly, by topic, or by another rule choice opted by the members.

At 615, and without letting the member of team A see such word, the members of team B are allowed to visualize various epict alternatives selected by the system for presenting such concept. The alternatives may be selected randomly, or, alternatively, may be selected based on a variety of scores/ratings for such epicts. The latter may be used, for example, to provide a reasonable cross section of challenges ranging from easy to difficult.

The members of team B can then (optionally) vote to eliminate (or select) one or more of the alternatives to be used by the system for team A at step 620. In some variants of the games the team members may be allowed to see the difficulty ratings of the epicts as measured by the performance of other individuals/teams.

During step 625 the final epict is then selected for team A based on the selection made by team B. In some cases it may be desirable to incorporate a randomizer at 630 to select in situations where the selection is not specifically defined.

At 635 the module further allows an option that gives team B yet another opportunity to impair or handicap team A's chances of success in decoding the epict. In particular the routine arbitrarily selects aspects/components of the image which can be selectively removed from the epic to make it more difficult to decipher. Thus team B is again presented with degraded variants of the epict to be shown to A, and they then make a final selection which is presented at step 640.

As an ancillary feature the teams (or individuals for that matter) can make use of a prediction component 650 which allows for review of epicts and their associated concepts to provide a prediction or vote as to whether such epict was is recognized by some (system definable) percentage of the community, and/or a prediction of what rating such epict garnered. For example the module may ask the participant a simple yes or no question about whether the epict was recognized within the allotted time by more than 50% of the population? (or more than 75%, etc.) The module can then further request the participant's estimate of the rating given by the community to the epict. The participants can then see how close or far off their predictions are for the epict in question. This aspect of the invention therefore further allows participants to glean insights into the collective thinking of their fellow gamers.

These rule variants are not necessary of course, but provide an additional element of play that may be attractive to some participants. Other examples of such variants will be apparent to skilled artisans from the present teachings.

Figure 7:
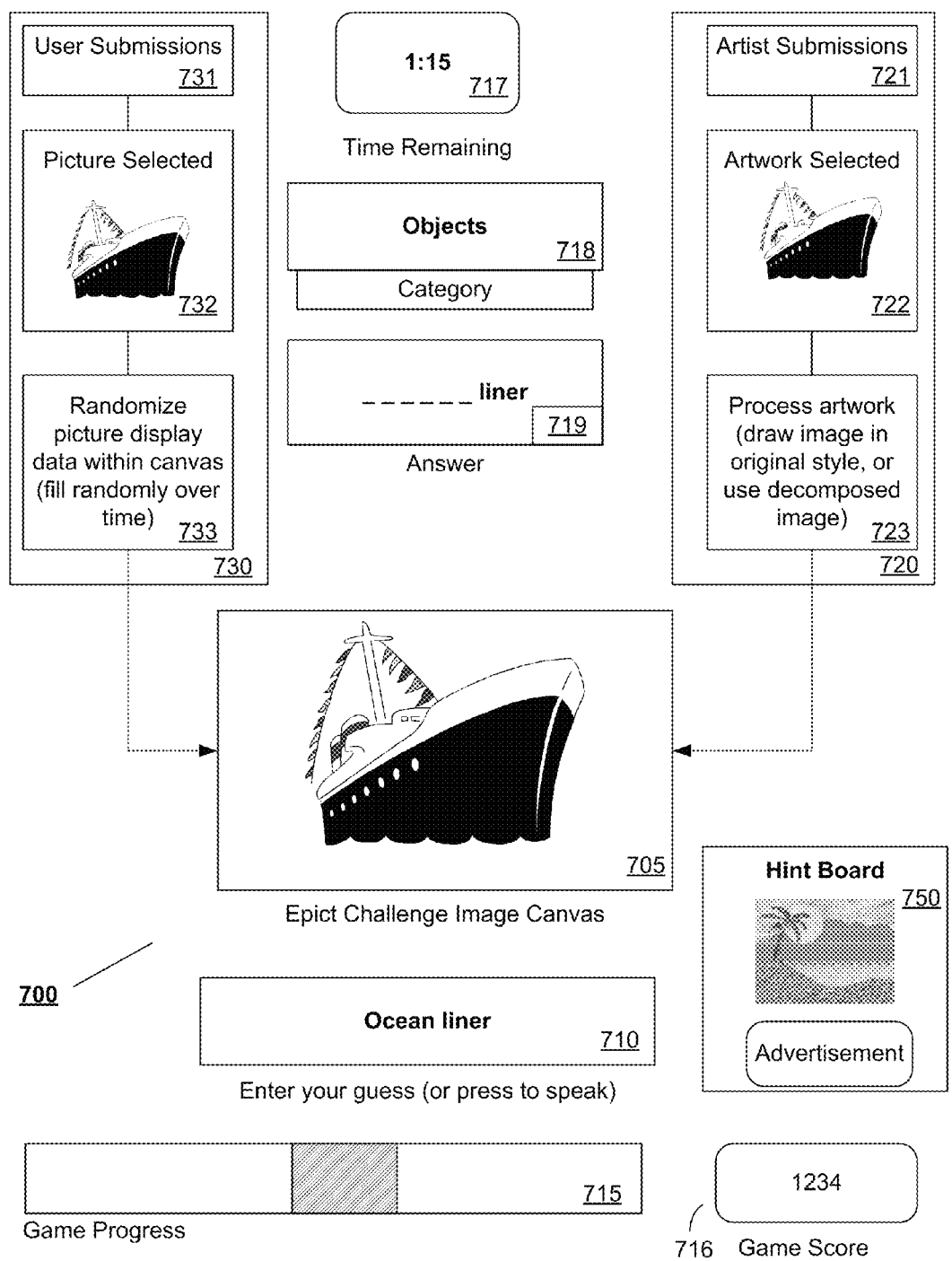
FIG. 7 depicts a preferred embodiment of a game screen used in a pictorial game.

FIG. 7 depicts a preferred embodiment of a game screen/interface 700 used by a participant in a pictorial game. This screen may be part of an interface that is presented within a conventional browser (or similar Internet browsing utility for a handheld device or game console) to interact with game websites. This same interface may be used as well, as noted above, in connection with user profile pages and the like maintained at social networking sites.

Within the interface the participant is shown an electronic canvas 705 in which the epict is presented visually. Again, the epict may be shown all at once, or it may be staggered as noted earlier. The canvass is preferably scaled in size so as to allow participants to visualize the image without noticeable compression, artifacts, etc.

At portion 710 the user is allowed to enter his/her guess of the object, by keying in an answer, selecting an answer by mouse, or speaking (in the case of a speech recognition embodiment). Other forms of input could be used as well (touch for example).

Section 715 of the interface informs the user of his/her progress in the game. For example the game may consist of a set number of epicts that must be completed to satisfy a game objective, and a time factor may be introduced as well. The participants' score is also displayed at 716.

A time remaining for guessing the epict is shown at 717 in any convenient visual form (digital, analog, hourglass, etc.) and in accordance with user preferences for the interface. In fact, preferably all elements of the interface can be scaled, arranged and formatted in accordance with a desired aesthetic of the user and to give a sense of customization.

The category selected by the user is identified at region 718 of the interface.

At portion 719 of the interface the game may display the answer if the user has selected it correctly (a semantic equivalent may be acceptable). In some instances it may be desirable to "recognize" partial correction portions of a user's answer, so that if he/she inputs "cruise liner" the invention would nonetheless accept and display the "liner" part of the provided answer as acceptable. This acts as a further clue for the participant that the prefix must be different. Other variants will be apparent to those skilled in the art.

The stock of epicts presented within interface 700 can come from multiple sources, including artist submissions 720, and user submissions 730. These are differentiated primarily on the basis of how the origin of the image, rather than any significant technical basis, since both can be accessed from a database 324 (FIG. 3A). Nonetheless the process by which epicts come into existence can be used to augment the accompanying metadata and presentation mode for the participant.

In a first case, artist submissions 721 preferably consist of images created by original artists using one of the drawing tools mentioned above. In such cases the original artwork 722 is selected, and then processed by a routine 723 in the manner noted above for FIGS. 3A and 3B. Thus the image is preferably presented all at once—in a static mode—or using some form of timing, as in a replay mode based on using an actual artist rendering time. The latter could be accelerated or slowed depending on other game parameters.

In other embodiments the epict could be presented in a degraded form (as noted above) that gradually improves with time, based on a variable number of iterations, time, etc. For example the image could be given incremental is improvements every 10 seconds until a final image is reached. The participant's score could be weighted according to how quickly they decoded the image (i.e. what level of degradation).

In similar fashion user submissions 731, which may be basic JPEG images, can also be selected at 732 as a form of epict. This type of content is perhaps easier to contribute since many users have electronic cameras, tools for uploading images, online picture accounts (Shutterfly, Flickr, etc.) that can be tapped into for content. The images are preferably pre-treated (see discussion for FIGS. 3A and 3B above) to render them into more artistic form, and/or to create different levels of degradation as noted above. Alternatively, in some embodiments it may be possible to impart this type of visual appearance on the fly within the interface, since sufficient time may be given between iterations to permit this degree of processing. In any event the images are presented, again, using one of the modes above, except of course that in such instances an original "artist" mode would not be possible in the case of a photograph instead of a drawing. Nonetheless it is possible that an artistic rendering could be mimicked in some cases using additional image processing software.

For some applications it may be desirable to simply divide the image file into physical regions, and present different sets of pixels within regions on a random basis. As an example, a set of N different iterations could be used. At the first iteration, X % of the pixels are revealed. At the second iteration, an additional set of Y % of the pixels for each region are revealed, and so on. This would give the image the appearance of randomly filling in with time. Other variants are of course possible and useable with the present invention.

As with the other embodiments above, the participant can also opt to use musical hints during the presentation of the epict. In addition a hint board 750 may also be displayed within the interface to give further clues to the participant. As noted earlier, the hint board may integrate advertising as well, and the ad stock itself may form part of the visual clue, by way of images, text, music/audio, etc. Because the participants' focus may shift within the interface to pick up and detect such clue, the chances of an ad being perceived (and thus selected is eventually) by the user increase dramatically. While the time is running for the epict the hint board images could also be changed if desired. In this respect the stock could be rotated randomly, or based on some programmed logic. In an embodiment where the epict deciphering is timed, the user's selection of an ad within the hint board can be used as a control signal to stop the game clock so that the participant is not penalized for viewing and interacting with an advertisement. For applications where timing is not used this would not be necessary of course.

The advertisers can then also be given options for bidding on what times their ads are presented within the hint board during game play. For example the right to present a visual hint/ad during an earlier portion of the game could be auctioned/priced at a different price than the right to offer the same hint/ad at a second time later in the process. An end-of-epict time option can also be offered, to allow an advertiser to occupy the interface for a longer period at the end of the game. Other options can also be offered, such as the right to opt in or out of an epict in which the participant was successful or not. All of these factors can be used to adjust an appropriate auction and compensation scheme.

The hint board ads could also be tailored based on a performance level achieved by the participant, and thus a predicted mood of the user. The user's mood could also be determined with reference to prosodic elements in a speech embodiment. For example a first type of ad might be shown if the user was successful in the current/prior epict, compared to a second type of ad if the user was unsuccessful. The invention can monitor the progress and performance of the user to increase (or decrease) the level of visual assistance through the hint board as needed to maintain an entertainment level for the participant. Most players will not want to play a game that is too easy or too hard, and this balance can be struck in part by adjusting the types of supplemental hints given within the interface. Again, too, the advertisers can participate and assist with such process by providing ad stock/associated epicts of various levels of explicitness for a particular concept. The advertisers may also opt to sponsor or present the musical hints and cues associated with the epict. The advertisers can then also be given options for bidding on different levels of visual/audio hints, so that the right to offer a first level of visual assistance is priced at a different price than the right to offer a second higher/lower level of assistance. Since it is more likely a participant will have a positive association with a hint that helps them solve the visual puzzle, this factor can be used to adjust an appropriate compensation scheme.

While some conventional online ads are presented in the form of a game (e.g., they require the user to interact with them, such as using a mouse) it can be seen that the hint board 750 instead behaves as a form of additional artist/participant for the game the user is engaged in. Those skilled in the art will appreciate that this feature may be used advantageously in other game environments in which it is desirable to impart clues/cues to a game player using an interactive ad.

While not shown explicitly the game can of course use and exploit demographic and other profile/behavioral data collected for participants to enhance game play. The epict database 324 of artist and author contributions can be made available to news aggregators, search engines, etc., so that relevant content is presented to web surfers looking for pertinent information on particular concepts.

As shown in FIG. 8, in some embodiments a search engine, blog, newsfeed or news site 800 may offer accents or other adornments of a page based on epicts contributed by an artist community. For example, a Google news story about a person/place may be coupled with one or more artist caricatures of such person/place.

Similarly, in a search engine page 810, a person looking for the Tower of London may be shown an epict 815 for such as part of the search results page. As with the above embodiments, the epict 815 (preferably compressed to thumbnail size) may be combined with an ad 820 to form a new ad 825, so that the attractiveness of ad stock can be increased for a general searcher using a search engine, and the chances of a click-through increased by virtue of the additional visual aesthetic. This mechanism further allows artists to tap into and is benefit from advertising dollars as they can be rewarded for their success in creating incremental benefits over conventional text only ads.

Search engine operators such as Google, Inc. can thus also maintain a stock of epicts/artists that can be bid upon with a conventional auction engine 830 by advertisers 835, much in the same way keywords are bid upon in an ADWORDS® campaign. The performance of individual epicts in clicks and conversions can be tracked as with any other keyword. This again would allow for a more efficient marketplace to acknowledge and recognize successful advertising copy contributed by artists.

The same advertising and epict coupling can be used of course in an ADSENSE® campaign as well, so that members of an advertising network can have pages 810 supplied by a combination of text and images proven to be attractive to web surfers. Since ADSENSE® campaigns are based on the content of the webpage 810 in question, a similar matching scheme could be done here. If desired, the ad and epict auctions could be de-coupled. That is, both would be evaluated separately for inclusion on a page, so that one matching engine would determine if the advertiser's ad is appropriate for the page, while a separate pictorial matching engine could use a separate algorithm to match metadata for the epict and thus select it that way. For example a site devoted to fishing may be served with ADSENSE® ads on fishing supplies, while the epict for the page may be in the form of a fishing boat, a hook, a boy fishing off a pier, etc. Other examples will be apparent to those skilled in the art.

Consequently epicts can be the subject of auctions based on keywords in queries, by which an advertiser first wins the right to present within the page, and then presents an epict along with the ad. In addition to this the advertiser may separately have to bid on the right to use a particular epict with an ad, so this could be part of a separate auction that is conducted after the first ad auction. Alternatively epicts can be presented based on the content of the pages, the search results, or the ads.

Other content sites and programs could access the epict database in question as well depending on a desired visual effect. Some music providers, is such as Itunes, may offer accompanying epicts for their songs/albums for example. In auction sites, members who do not otherwise have visual images for an offering can elect to use an epict instead at nominal cost. Members of social networking sites may elect to adorn their profile pages with static or rotating epicts devoted to particular set themes, or dynamically based on topics of discussion presented within a discussion wall. The invention can thus mimic the behavior of conventional ad-serving systems which present ads based on the content of a web page. In other words, the content of a web page can be analyzed to determine one or more related topics which are then matched to one or more topics associated with image in a database of images/topics.

All of the above schemes could be implemented under a royalty scheme that rewards the artists/authors in question.

It will be understood by those skilled in the art that the above are merely examples and that countless variations on the above can be implemented in accordance with the present teachings. A number of other conventional structures/steps that would be included in a commercial application have been omitted, as well, to better emphasize the present teachings.

It will be apparent to those skilled in the art that the modules of the present invention, including those illustrated in the figures can be implemented using any one of many known programming languages suitable for creating applications that can run on large scale computing systems, including servers connected to a network (such as the Internet). The details of the specific implementation of the present invention will vary depending on the programming language(s) used to embody the above principles, and are not material to an understanding of the present invention. Furthermore, in some instances, a portion of the hardware and software will be contained locally to a member's computing system, which can include a portable machine or a computing machine at the users premises, such as a personal computer, a PDA, digital video recorder, receiver, etc.

Furthermore it will be apparent to those skilled in the art that this is not the entire set of software modules that can be used, or an exhaustive list of all operations executed by such modules. It is expected, in fact, that other features will be added by system operators in accordance with customer preferences and/or system performance requirements. Furthermore, while not explicitly shown or described herein, the details of the various software routines, executable code, etc., required to effectuate the functionality discussed above in such modules are not material to the present invention, and may be implemented in any number of ways known to those skilled in the art. Such code, routines, etc. may be stored in any number of forms of machine readable media.

The above descriptions are intended as merely illustrative embodiments of the proposed inventions. It is understood that the protection afforded the present invention also comprehends and extends to embodiments different from those above, but which fall within the scope of the present claims.

What is claimed is:

1. A method of conducting a pictorial based electronic game comprising the steps:
   automatically constructing a library of candidate game images, which candidate game images include images of scenes captured by digital and/or photographic machines and embodied in digital and/or photographic form;
   storing said candidate game images on a user associated device or on a server configured to communicate with said user associated device;
   for each of said candidate game images, automatically generating different, progressively degraded versions of said candidate game images by performing processing on said candidate game images to alter at least one of a pixilation, noise, or resolution of said candidate game images to obscure content of said candidate game images;
   selecting a first game image from among said candidate game images;
   presenting a first, highly degraded one of said different, progressively degraded versions for said first game image and successively presenting progressively less degraded ones of said different, progressively degraded versions over a first time period until an entire content of said first game image is revealed;
   associating said first game image with one or more concepts;
   providing a rule set for a user to use to predict an identity of said one or more concepts; and
   processing responses from the user in compliance with said rule set to determine if said user has accurately determined an identity of said one or more concepts associated with said first game image;
   wherein said first game image is presented to the user during at least a portion of said first time period substantially without textual information describing said one or more respective concepts.

2. The method of claim 1 further including a step: combining said digital and/or photographic form with other metadata for the scene into said first game image.

3. The method of claim 1 further including a step: causing a computing system to automatically find digital and/or photographic form images in one or more Internet accessible image repositories.

4. The method of claim 1 further including a step: generating and storing scene component and scene timing information for said scene as part of said first game image.

* * * * *